United States Patent [19]

Nonaka et al.

[11] 4,335,957

[45] Jun. 22, 1982

[54] IMAGE FORMING METHOD AND APPARATUS THEREFOR

[75] Inventors: Kohei Nonaka, Yokohama; Masahiro Koyama, Kawasaki; Makoto Gonmori, Tokyo; Takeo Kimura; Tetsuo Shiga, both of Fuji, all of Japan

[73] Assignee: Asahi Kasie Kogyo Kabushiki Kaisha, Tokyo, Japan

[21] Appl. No.: 266,240

[22] Filed: May 22, 1981

Related U.S. Application Data

[62] Division of Ser. No. 63,306, Aug. 2, 1979, Pat. No. 4,287,295.

[30] Foreign Application Priority Data

Aug. 11, 1978 [JP] Japan ............................ 53-98524
Jun. 22, 1979 [JP] Japan ............................ 54-78688

[51] Int. Cl.[3] ............................ G03B 27/32

[52] U.S. Cl. ............................ 355/30; 430/349

[58] Field of Search .................. 355/30; 430/349, 353

[56] References Cited

U.S. PATENT DOCUMENTS

| | | | |
|---|---|---|---|
| 3,259,494 | 7/1966 | Schlein et al. | 430/353 X |
| 3,585,031 | 6/1971 | Hayes | 430/353 X |
| 3,764,329 | 10/1973 | Lee et al. | 430/353 X |
| 4,198,145 | 4/1980 | Scott | 354/299 X |

*Primary Examiner*—Michael L. Gellner
*Attorney, Agent, or Firm*—Sughrue, Mion, Zinn, Macpeak & Seas

[57] ABSTRACT

A method and apparatus for forming an image using an image forming sheet that is normally non-photosensitive but can be rendered photosensitive by preheating and is exposed at the preheated area to a light image to form therein a latent image and then heat-developed to form a visible image. After preheating, the preheated area is cooled by cooling means prior to exposure.

35 Claims, 26 Drawing Figures

IMAGE FORMING METHOD AND APPARATUS THEREFOR

This is a continuation of application Ser. No. 63,306, filed Aug. 2, 1979 now U.S. Pat. No. 4,287,295.

BACKGROUND OF THE INVENTION

This invention relates to an image forming method for a heat-developable image forming sheet of the type that is rendered photosensitive by preheating prior to exposure, and exposed to form therein a latent image and then heat-developed to obtain a visible image, and the invention also pertains to apparatus therefor.

A heat-developable image forming sheet, which is rendered by photosensitive preheating prior to exposure, is exposed to form therein a latent image and then is heated to obtain an image (which sheet will hereinafter be referred to simply as the image forming sheet), can provide thereon a visible image only by the dry process, and the image forming sheet is non-photosensitive before it is made photosensitive by preheating. Accordingly, when only a specified area of the image forming sheet is rendered photosensitive by preheating, exposing and then heat-developing, an image is formed only in the specified area, but the other areas which are not made photosensitive at first remain non-photosensitive. Consequently, the abovesaid image forming sheet permits additional recording of an image thereon by preheating and exposing a specified section of an unrecorded area and then heat-developing it.

To render such an image forming sheet photosensitive by preheating is referred to as heat activation, and to render a latent image into a visible image by heating is called heat development.

With a conventional image recording method involving the preheating-exposure-heat development process for the image forming sheet, it is difficult to obtain a sharply-outlined, finely-contrasted, clear image. If a sharply-outlined, finely-contrasted, sharp image can be formed on a desired area of the image forming sheet within a short period of time, then it is possible to enhance superiority and usefulness of the image forming sheet by permitting additional image recording and provide convenient and useful recording means.

An object of this invention is to provide an image forming method and apparatus therefor which substantially increase the sensitivity of the image forming sheet to produce a sharply-outlined, finely-contrasted image and which reduce the time for obtaining a visible image.

Another object of this invention is to provide image forming apparatus which permits handling of the image forming sheet in a light room, and hence is simple-structured, and permits recording and development of information on the image forming sheet by the dry process.

Still another object of this invention is to provide image forming apparatus which, in the case of the image forming sheet having a number of image forming areas, enables the sheet having an image recorded in one of its image forming areas to be taken out of the image forming apparatus and then reinserted thereinto for additional recording of an image in an unrecorded image forming area.

As a result of intensive research, made with a view to achieving the abovesaid objects, for improvement in the image forming method for the image forming sheet, the present inventors have found out that exposure of the image forming sheet in a cooled state after preheating the sheet to render it photosensitive substantially enhances its sensitivity to provide a sharply-outlined, finely-contrasted visible image, and have now completed this invention.

SUMMARY OF THE INVENTION

This invention is directed to a heat-developable image forming method for an image forming sheet that is rendered photosensitive by preheating prior to exposure and exposed to form therein a latent image and then heat-developed to obtain a visible image, which method is characterized in that after preheating the image forming sheet to render it photosensitive in a specified area, at least the area rendered photosensitive is cooled prior to exposure, and the invention is also directed to apparatus therefor.

Any image forming sheet can be employed in this invention so long as it is of the type which becomes photosensitive by preheating prior to exposure and forms a latent image by exposure and then produces a visible image by heat development.

A typical example of this kind of image forming sheet is made of material which is called the dry-silver photosensitive material containing an oxidation-reduction reaction system which includes at least an organic silver salt oxidizing agent and a silver ion reducing agent for a silver ion. A more specific example of this image forming material will hereunder be described.

A specific example of the image forming sheet for use in this invention is made of a material which consists essentially of a non-photosensitive organic silver salt oxidizing agent, a silver halide or a source of halogen ions capable of forming the silver halide by reaction with the organic silver salt oxidizing agent, a reducing agent for a silver ion, a binder, a source of mercury ion. As another example of such a material for the image forming sheet that may be used in this invention, there is a material which consists essentially of a non-photosensitive organic silver salt oxidizing agent, a reducing agent for a silver ion, a binder, a source of mercuric ion, carboxylic acid and/or a sensitizing dye.

The former material is disclosed, for example, in U.S. Pat. Nos. 3,802,888, 3,764,329 and 4,113,496, whereas the latter one is disclosed, for example, in U.S. Pat. No. 3,816,132 and Japanese Patent Application Laid Open No. 127,719/76.

As examples of the abovesaid non-photosensitive organic silver salt, there can be mentioned silver salts of long-chain fatty acids, or silver salts which are organic compounds having imino or mercapto group. The above silver salts include, for example, silver stearate, silver behenate, silver salts of benzotriazole, silver 5-nitrobenzotriazole, silver 5-nitrobenzimidazole, silver saccharin, silver phthalazinone, silver 2-mercaptobenzoimidazole, and silver 3-mercapto-4-phenyl-1,2,4-triazole. Of them, silver salts of long-chain fatty acids, such as silver stearate and silver behenate, are especially preferred. The organic silver salt oxidizin agent is used in an amount of about 0.1 to about 50 g/m$^2$, preferably 1 to 10 g/m$^2$. As the abovementioned silver halide, there are silver chloride, silver bromide, silver iodide, silver chlorobromoiodide, silver chlorobromide, silver iodobromide, silver chlorobromide and a mixture thereof.

The silver halide may be used in an amount of about 0.1 to about 40 mol %, preferably 0.5 to 20 mol %, based on the amount of the silver salt oxidizing agent.

As example of the source of halogen ions which capable of forming a silver halide by reaction with the organic silver salt oxidizing agent, there can be mentioned a reducible halogen compound having the essential structure —CONX— or —$SO_2NX$— where in X is chlorine, bromine or iodine, such as disclosed in U.S. Pat. No. 3,764,329. As another example of such source can be mentioned an inorganic halides represents by $HgX_2$, $CaX_2$, $COX_2$, $BaX_2$, CsX, RbX, $MgX_2$, $NiX_2$, $GeX_4$ and $PbX_2$ (X representing chlorine, bromine or iodine); organic halides having the specific element of which any one of Ga, Sn, Pb, P, As, Sb, Bi, Se and Te. Such halide, for example, may be used,

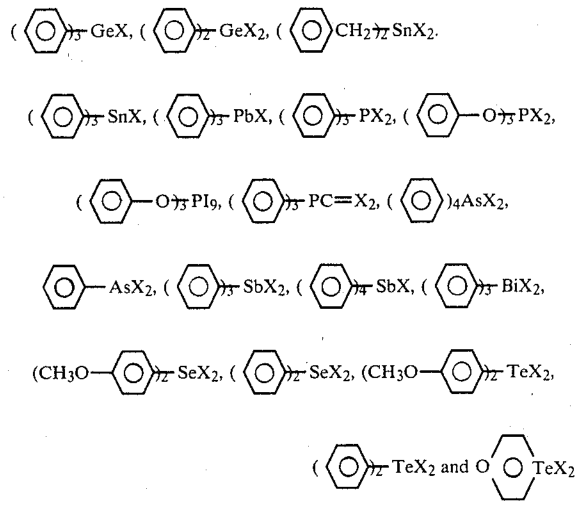

(X representing chlorine, bromine or iodine); halogen molecules or species selected from bromine, iodine, iodine chloride, iodine bromide and bromine chloride; complexes of halogen molecules and specific compound such as P-dioxane; and organic halogen compound, such as triphenylmethyl bromide, triphenylmethyl chloride, iodoform, 2-bromoethanal, α-bromodiphenylmethane, α-iodophenylmethane, α-chlorodiphenylmethane, α-bromo-di(p-methoxyphenyl) methane, etc. The amount of such a halogen ion source to be used is about 0.1 to about 40 mol%, preferably 0.5 to 20 mol%, based on the amount of the organic silver salt oxidizing agent.

A reducing agent suitable for reducing silver ions is a hindered phenol in which one or two sterically bulky groups are bonded to the carbon atom or atoms contiguous to the hydroxyl group-bonded carbon atom to sterically hinder the hydroxyl group. As example of such hindered phenols, ther can be mentioned 2,6-di-tert-butyl-4-methylphenol, 2,2'-methylenebis (4-methyl-6-tert-butylphenol), 2,4,4-trimethyl-pentyl-bis (2-hydroxy-3,5-dimethylphenyl)-methane and 2,6-bis-(2'-hydroxy-3'-tert-butyl-5'-methylbenzyl)-4-methylphenol. The reducing agent may be used in the amount of 0.1 to 100 wt%, preferably 1 to 100 wt%, relative to the organic silver salt oxidizing agent.

As the source of mercuric ion, there can be mentioned mercuric acetate, mercuric behenate, mercuric benzoanate and mercuric halide.

As the organic carbonic acid, behenic acid, stearic acid and so forth are suitable. The amount of source of mercuric ion to be used is 0.1 to 7% based on the amount of the silver, which used the image forming sheet.

As the sensitizing dye, merocyanine is suitable, and examples of such dye include such as those set forth in "Organic Chemicals List", published by Nippon Kanko Shikiso Kenkyusho (Japan Photosensitive Dye Institute), pp 102–105, 1969, and pp 25–27, 1974.

As the binder, there can be mentioned polyvinyl butyral, polyvinyl formal, polymethyl metacrylate, cellulose acetate, polyvinyl acetate, cellulose acetate propionate, cellulose acetate butyrate, polystyrene and gelatin. Of them, polyvinyl butyral is especially suitable as the binder. The may be used singly or in the form of a mixture of two or more of them. It is preferred that the binder may be used in such an amount that the weight ratio of the binder to the organic silver salt oxidizing agent is in the range of from about 10/1 to about 1/10, preferably 1.2/1 to ½.

The material of the image forming sheet for use in this invention may further contain, as required, modifiers such as a toner for a silver image, a background-darkening preventive agent and a sensitizer in addition to the abovesaid ingredients. As the toner for a silver image, there can be mentioned, for example, phthalazinone and phthalimide. As the background-darkening preventive agent, there can be mentioned, for example, tetrabromobutane, hexabromocyclohexane and tribromoquinalidine.

The abovementioned composition is coated on a transparent support, such as a polyethylene film, a cellulose acetate film or a polyester film together with the abovementioned binder and a suitable solvent. The thickness of the coating is about 1 to about 1,000 μ, preferably 3 to 20 μ. The ingredients of the composition may each be laminated in two or more layers, optionally. The sheet thus obtained is non-photosensitive under normal lighting conditions, and it can be handled in a light room. When a given area of this sheet is preheated in the dark, this area is rendered photosensitive.

The preheating temperature for rendering the image forming sheet photosensitive is usually 80° to 130° C., preferably 90° to 120° C. The lower the temperature is, the longer the time of preheating becomes. For additional recording, it is necessary that only a desired area to form thereon an image be rendered photosensitive by preheating. This can be achieved using a heating plate or block whose heating area is limited to the image forming area of the image forming sheet, or a hot wind or infrared or far infrared ray device which is adapted so that the range of irradiation can be limited. If no additional recording is required, the heating area need not be limited.

In the present invention, preheating is followed by cooling, as described previously. As will become apparent from embodiments of this invention described later, it is desirable that the temperature of the image forming area of the image forming sheet is made, by this cooling, as much lower than the preheating temperature as possible. It is preferred that the temperature of the image forming sheet after being cooled is below 60° C., particularly preferably below 40° C. In practice, the lower limit of this temperature is about room temperature.

The cooling of the image forming sheet can be achieved, for example, by contacting a metal block or the like of excellent thermal conductivity with the sheet, or blowing air of room temperature or low-temperature gas against the sheet.

For exposure of the image forming sheet, it is possible to employ, for example, such a method that transmitted or reflected light from a subject is projected through a projecting lens to the photosensitive layer of the image forming sheet to expose it to a light image of the subject. For heat development, the same method as that for preheating can be employed. The heating temperature for development is 100° to 150° C., preferably 110° to 130° C. It is also possible to use the preheating means as the heat-development means or these two means separately. Since different conditions are required for preheating and heat development respectively in many cases, it is preferred to provide first heating mean for preheating and a second heating means for heat development individually. In order to form an image on the image forming sheet at a specified position and make additional recording, it is desirable to provide image forming sheet transfer means and fixing means by which the image forming sheet is moved to a predetermined position and fixed there for each processing. Further, it is preferred to employ control means for controlling the operation timings of the heating means, cooling means, exposure means and heat-development means and, if necessary, the transfer means and the fixing means, their operating times and temperatures.

In the image forming apparatus of this invention which employs the image forming sheet that is rendered photo-sensitive by preheating prior to exposure, exposed to a light image to form a latent image and then heat-developed to produce a visible image, there is provided cooling means for cooling the preheated area of the image forming sheet in the time interval between preheating and exposure; furthermore, image forming sheet fixing means is provided for fixing the image forming sheet so that its image forming areas to be preheated, cooled, exposed and heat-developed are held in position in the respective processes. At least two of the preheating means, the cooling means, the exposure means and the heat-development means are arranged in alignment to permit parallel processing of the aligned means.

BRIEF DESCRIPTION OF THE DRAWINGS

FIGS. 20 and 22 are photosensitive characteristic curves, using as a parameter the degree of cooling of the image forming sheet after the preheating process but before the exposure process.

DESCRIPTION OF THE PREFERRED EMBODIMENTS

Figure 1:
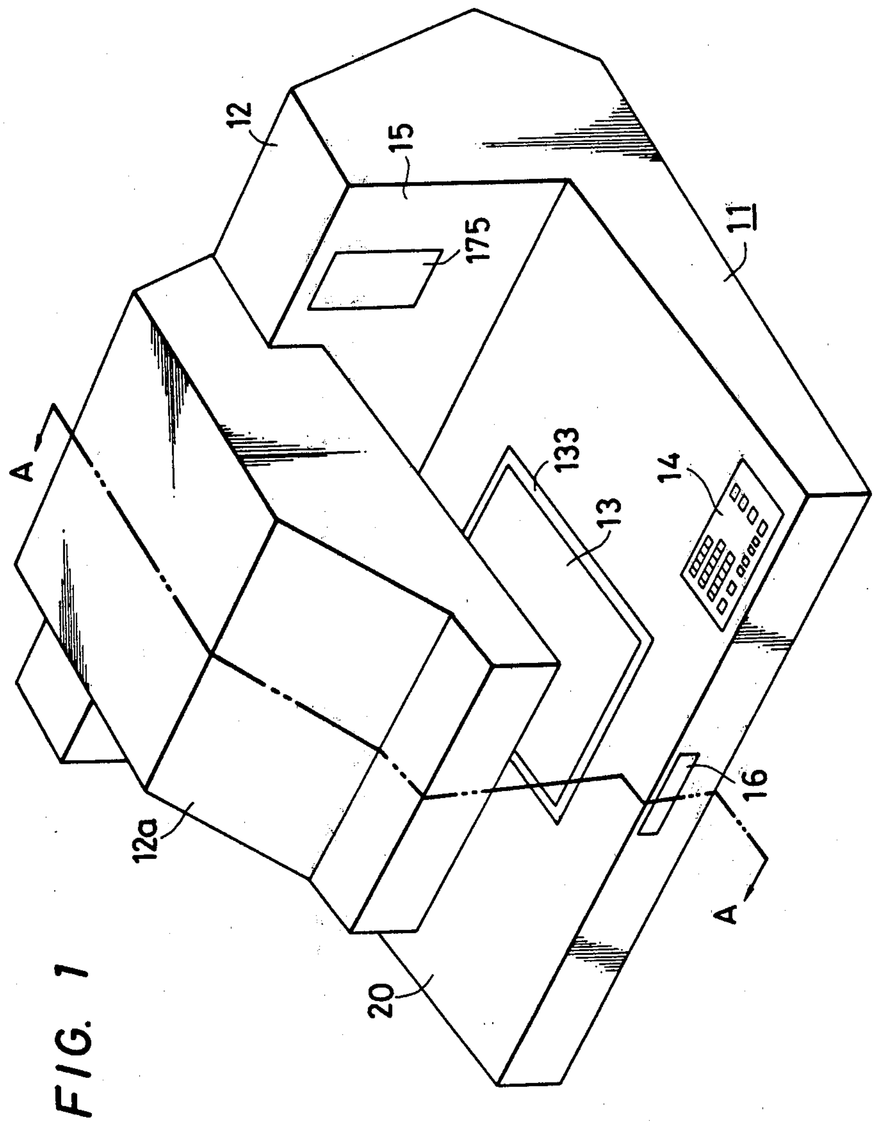
FIG. 1 is a perspective view schematically showing an external appearance of the image forming apparatus of this invention.

The image forming equipment of this invention has an external appearance such, for example, as shown in FIG. 1. A housing 12 is mounted on a base 11 at is backward portion and a subject holding part 13 is provided on the base 11 at its forward portion. An optical image introducing part 12*a* for introducing reflected light from the subject holding part into the housing 12 is mounted thereon to extend above the subject holding part 13. A control panel 14 is disposed on an upper panel 20 of the base 11 at a corner near its front panel, the control panel 14 having arranged thereon various control keys for controlling the image forming equipment. The front panel of the base 11 has mounted thereon a lid 16 for covering an image forming sheet insertion window. A screen 15 for projecting thereon an image is provided on a front panel 15 of the housing 12 at its one side.

Figure 2:
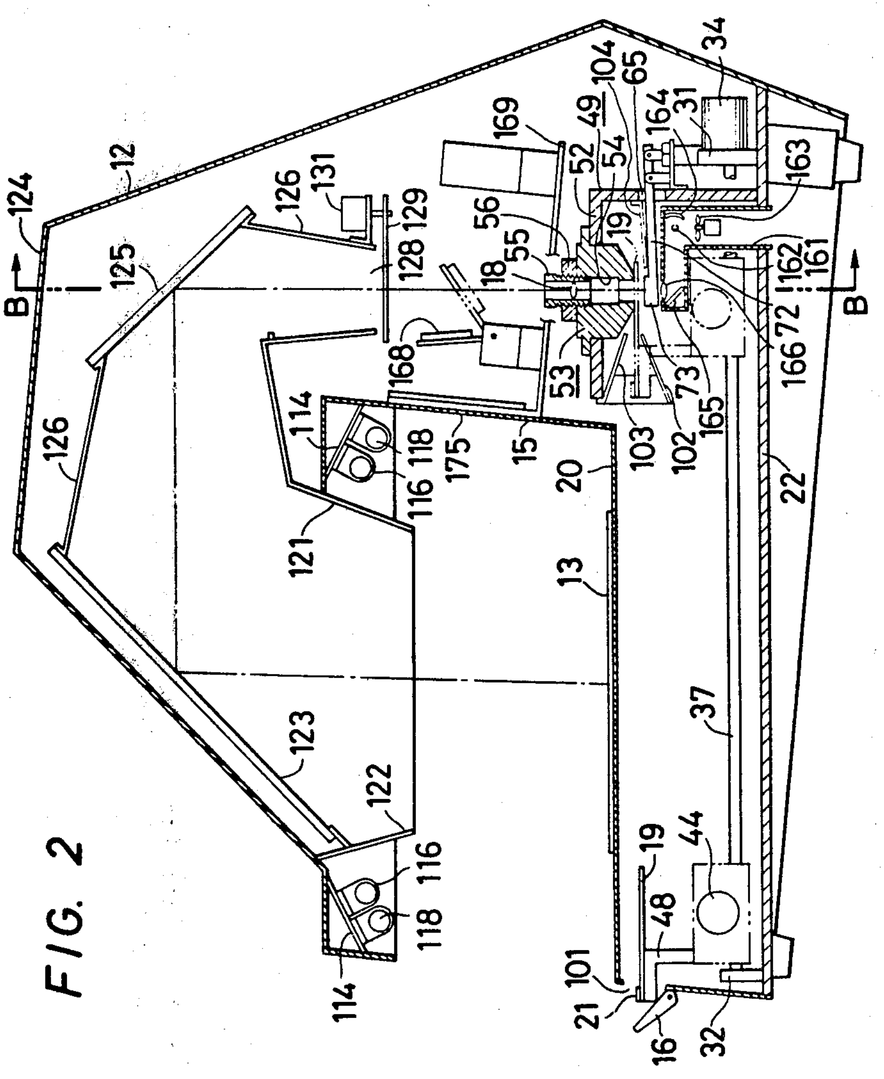
FIG. 2 is a cross-sectional view taken on the line A-A in FIG. 1.
Figure 3:
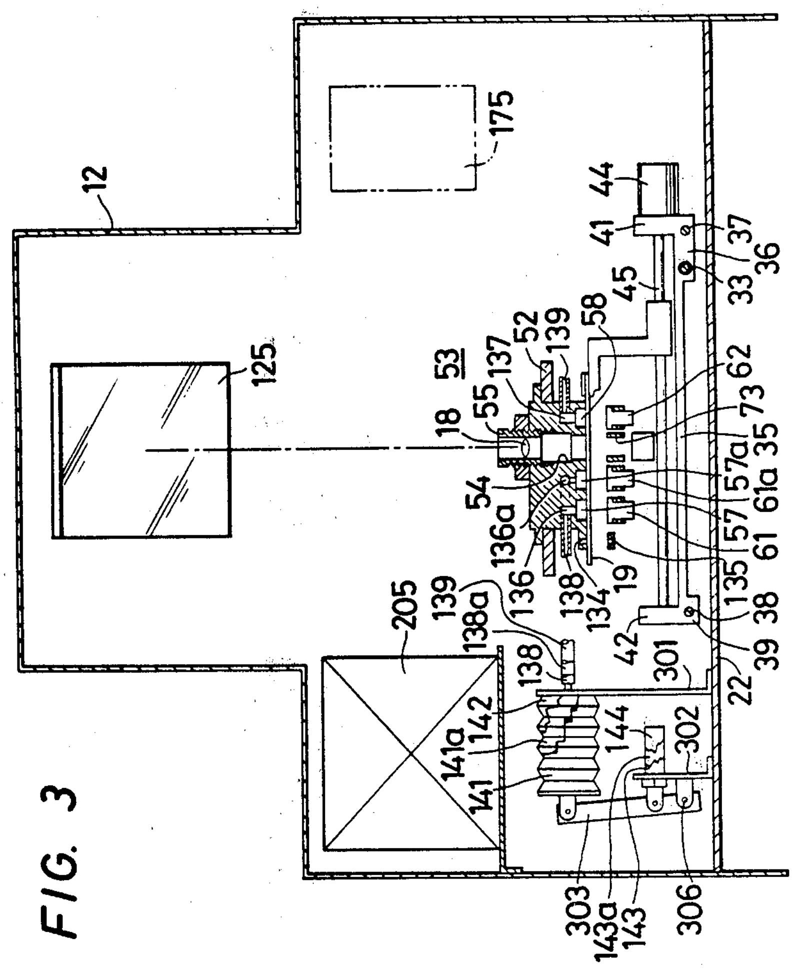
FIG. 3 is a cross-sectional view taken on the line B-B in FIG. 2.

As shown in FIGS. 2 and 3, a projecting lens 18, which forms a part of exposing means, is disposed in the housing 12 at the center thereof. An image forming sheet 19 is movably placed at a position where an image of a subject projected by the lens 18 is formed, i.e. at an image exposing position. The image forming sheet 19 is held by a holder 21, as shown in FIG. 4, and the holder 21 is supported and carried by transfer means.

Figure 4:
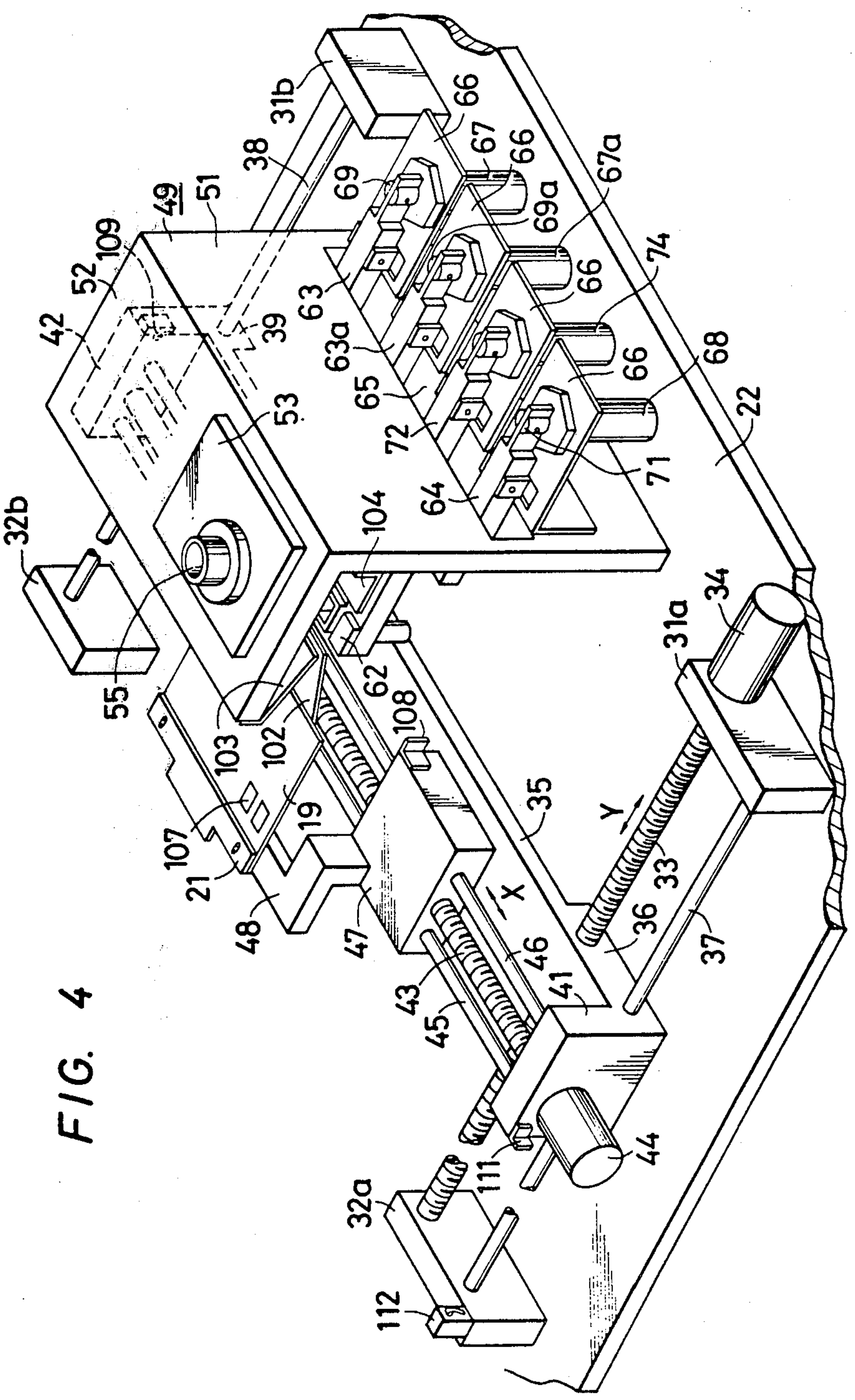
FIG. 4 is a perspective view showing the relationship between image forming sheet transfer means and a body tube members.

The transfer means is arranged, as shown in FIGS. 2 and 3 are as illustrated on an enlarged scale in FIG. 4. The upper panel 20 of the base 11 on which the subject holding part 13 is provided is slightly tilted forwardly, and a base plate 22 in the base 11 is also tightly slanted forwardly. As shown in FIG. 4, supports 31*a*, 31*b*, 32*a* and 32*b* are mounted on the base plate 22 near its four corners.

A threaded shaft 33 is rotatably installed between the supports 31*a* and 32*a* to extend in a direction perpendicular to the front panel of the base 11. One end portion of the threaded shaft 33 projects out of the support 31*a*, and a Y-direction motor 34 is mounted on the support 31*a* on the side of the projecting end portion of the threaded shaft 33. The threaded shaft 33 is driven by the Y-direction drive motor 34. The threaded shaft 33 is screwed in a tapped hole made in a support portion 36 formed at one end portion of a Y-direction moving member 35 which extends in a direction perpendicular to the direction of extension of the threaded shaft 33, so that the Y-direction moving member 35 is moved by the rotation of the threaded shaft 33 in the direction of its extension. Between the supports 31*a* and 32*a* is also bridged a guide rod 37 in adjacent and parallel relation to the threaded shaft 33, and the guide rod 37 is inserted in a through hole made in the support portion 36, by which the moving member 35 is held in a manner to be movable without rotation. Similarly, a guide rod 38 is installed between the supports 31*b* and 32*b* and inserted in a hole made in a support portion 39 formed at the other end portion of the moving member 35, permitting the moving member 35 to move in parallel to the base plate 22 in the direction of extension of the threaded shaft 33. Let this direction of movement be assumed to be a Y-axis direction, for example. A pair of support pieces 41 and 42 are fixedly secured to the both end portions of the Y-direction moving member 35 which is made movable in the Y-direction. An X-direction threaded shaft 43 is rotatably bridged between the support pieces 41 and 42. One end of the X-direction threaded shaft 43 projects out of the support piece 41, and an X-direction drive motor 44 is fixedly mounted on the support piece 41 on the side of the projecting end of the threaded shaft 43. The X-direction threaded shaft 43 is driven by the motor 44. In adjacent and parallel relation to the X-direction threaded shaft 43, guide rods 45 and 46 are bridged between the support pieces 41 and 42. An X-direction moving member 47 is provided through which the X-direction threaded shaft 43 and the guide rods 45 and 46 extend. The X-direction moving member 47 and the X-direction threaded shaft 43 are threadably engaged with each other; accordingly, rotation of the X-direction threaded shaft 43 causes the X-direction moving member 47 to move to the right and left, that is, in the X-axis direction.

Figure 6:
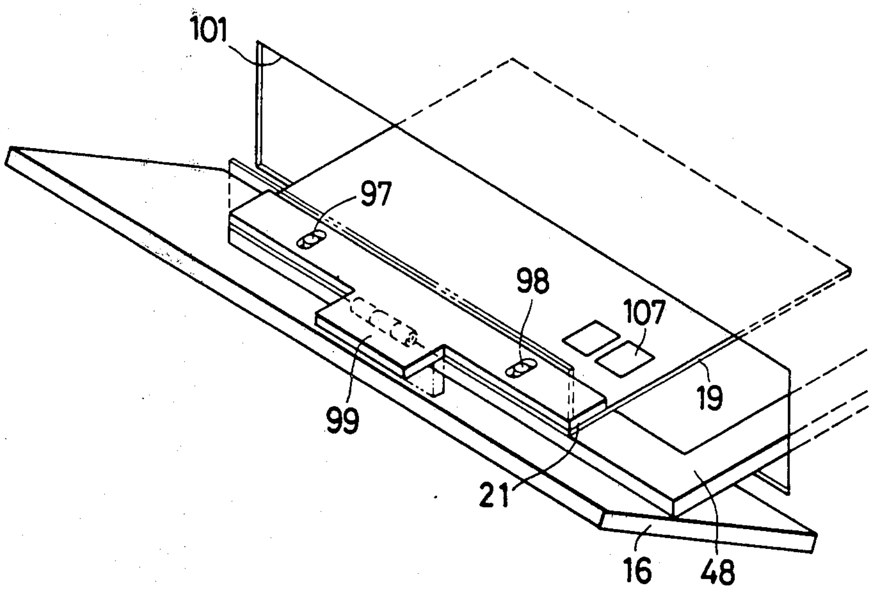
FIG. 6 is a perspective view illustrating the state in which an image forming sheet holder is positioned at an image forming sheet insertion window.

The X-direction moving member 47 has attached thereto an arm-shaped support 48, to which is pivoted the image forming sheet holder 21, as shown in FIGS. 2, 4 and 6. A pair of positioning pins 97 and 98 planted on the support 48 are inserted into apertures formed in one marginal portion of the image forming sheet 19, and the marginal portion of the sheet 19 is pressed by the holder 21 against the support 48. In this case, a coiled spring is mounted about the pivot of the holder 21 though not shown, and by this spring the holder 21 is urged against the support 48 with the image forming sheet 19 gripped therebetween. The holder 21 has made therein holes for receiving the positioning pins 97 and 98. To facilitate mounting and dismounting of the image forming sheet 19, an intermediate portion of the outer marginal portion of the holder 21 is formed to project outwardly, providing an operating piece 99. By pressing the operating piece 99, the holder 21 can easily be turned against the biasing force of the abovesaid coiled spring.

The lid 16 is also adapted to be automatically closed by a spring. When the image forming sheet 19 is mounted on the support 48 or dismounted therefrom, the holder 21 is brought forward, by the Y-direction motor 34, to its outermost position, where the support 48 pushes the lid 16 forwardly through an opening 101 (FIG. 6) formed in the front panel of the base 11; namely, the lid 16 is turned to open against the biasing force of the spring (not shown) so that the holder 21 comes out from the opening 101. This position is a reference position of the holder 21, where the image forming sheet 19 can be mounted on or dismounted from the support 48. When the support 48 is brought back into the base 11, the lid 16 is automatically turned to cover the opening 101. Thus, unnecessary light can automatically be shut out of the equipment.

It is preferred to provide a guide by which the image forming sheet 19 held by the holder 21 is brought to an exposing or heating position. The guide comprises, for example, upper and lower guide plates 103 and 102 attached to a photographing unit support 49, as depicted in FIGS. 2 and 4. The distance between the upper and lower guide plates 103 and 102 is gradually reduced as a body tube member 53 supporting the projecting lens 18 is approached, and the image forming sheet 19 is guided to the exposing or heating position under the body tube member 53 passing between the guide plates 103 and 102.

Further, a guide plate 104 for guiding the image forming sheet 19 having moved past the body tube member 53 is attached to a vertical wall 51 of the photographing unit support 49 to extend backwards from the vicinity of the body tube member 53 under the image forming sheet 19, that is, on the side of the base plate 22. It is preferred that these guide plates 102 to 104 are made of resilient thin sheet of a synthetic resin or phosphor bronze. The guide plates need not always be made flat but may also be curved. With the provision of such guide, the image forming sheet 19 pressed by the holder 21 at one side only can surely be brought to a photographing position without being bending. The guide is not limited specifically to the abovesaid but may also be other types. For example, in the case of the image forming sheet 19 being bent, it is possible to guide the sheet 19 by revolving belts or rollers to the photographing position while straightening the bend of the sheet 19.

The image forming sheet 19 has a plurality of image forming areas or so-called frames 107 arranged in a matrix form, as shown in FIG. 4. The image forming sheet 19 is mounted on the support 48 in such a manner that any desired one of the frames 107 can be brought exactly to the exposing or heating position. The support 48 is halted at the aforementioned reference position, where the holder 21 assumes its outermost position. To perform this, for example, as shown in FIG. 4, a projecting piece 108 is secured to the X-direction moving member 47 so that immediately before the X-direction moving member 47 reaches the support 42, the projecting piece 108 moves into contact with a microswitch 109 attached to the support 42 to stop there the X-direction movement. Likewise, a projecting piece 111 is secured to the support 41 of the Y-direction moving member 35, and immediately before the moving member 35 reaches the support 32, the projecting piece 111 moves into contact with a microswitch 112, halting there the Y-direction movement. In this manner, by driving the micro-switches 109 and 112, the support 48 is stopped at the reference position, that is, at its outermost position. As the motors 44 and 34, use is made of drive motors capable of controlling the amount of movement with high accuracy, for example, step motors, and by the numbers of pulses applied to the motors, the amount of movement of the image forming sheet 19 from the aforesaid reference position in the X- and Y-axis direction can be determined and an accurate position of the image forming sheet 19 can be detected. In the manner described above, a desired one of the frames or the image forming areas 107 on the image forming sheet 19 is brought to the heating or exposing position.

The image forming sheet 19 may take the form of not only a microfilm that a plurality of frames are arranged in matrix form on a sheet of film but also a roll film having arranged thereon many frames in side-by-side relation or a cut film having formed thereon only one frame. The micro-film-type image forming sheet 19 may be held by the holder at two or more sides as well as at one side; however, from the standpoint of contacting the image forming sheet 19 with the end face of a heater over its entire area and pressing the sheet 19 against the body tube member 53, it is preferred that the sheet 19 is held at one side.

Reference is made next to FIGS. 2 to 4 for illustrating an example of each of heating means, cooling means and exposure means which form the principal part of the equipment of this invention, and for describing the construction of each of them at each of heating, cooling and exposing positions in the illustrated embodiment. In this embodiment, the heating means comprises preheating means and heat-developing means provided separately, and these two means are described to be in the form of high-temperature solid bodies, for example, metal blocks. Also, the cooling means is formed with a solid body for cooling, for example, a metal block. As shown in FIGS. 3 and 4, the inverted L-shaped photographing unit support 49 is fixedly mounted on the base plate 22 at its backward portion. The vertical wall 51 of the support 49 extends upwardly of the base plate 22 at substantially right angles thereto, and an upper horizontal plate member 52 of the support 22 extends towards the front panel 15 in substantially parallel relation to the base plate 22. The upper plate member 52 has made therein a hole 55, in which the body tube member 53 is snugly fitted and fixed.

The body tube member 53 is formed, for example, with a metal block, in which a through hole 54 is formed to extend in a direction vertical to the base plate 22, and the lens 18 is disposed in the through hole 54. In the body tube member 53 there are formed on the left and right of the through hole 54 recesses 57, **57*a* and 58 which open to the base plate 22, and the recesses 57, 57*a* and 58 each have a size corresponding to each image forming area or frame 107 of the image forming sheet 19. The peripheral margin of each recess, on all sides, is made frame-shaped to form a part of means for fixing the image forming sheet 19** during heating.

Figure 5:
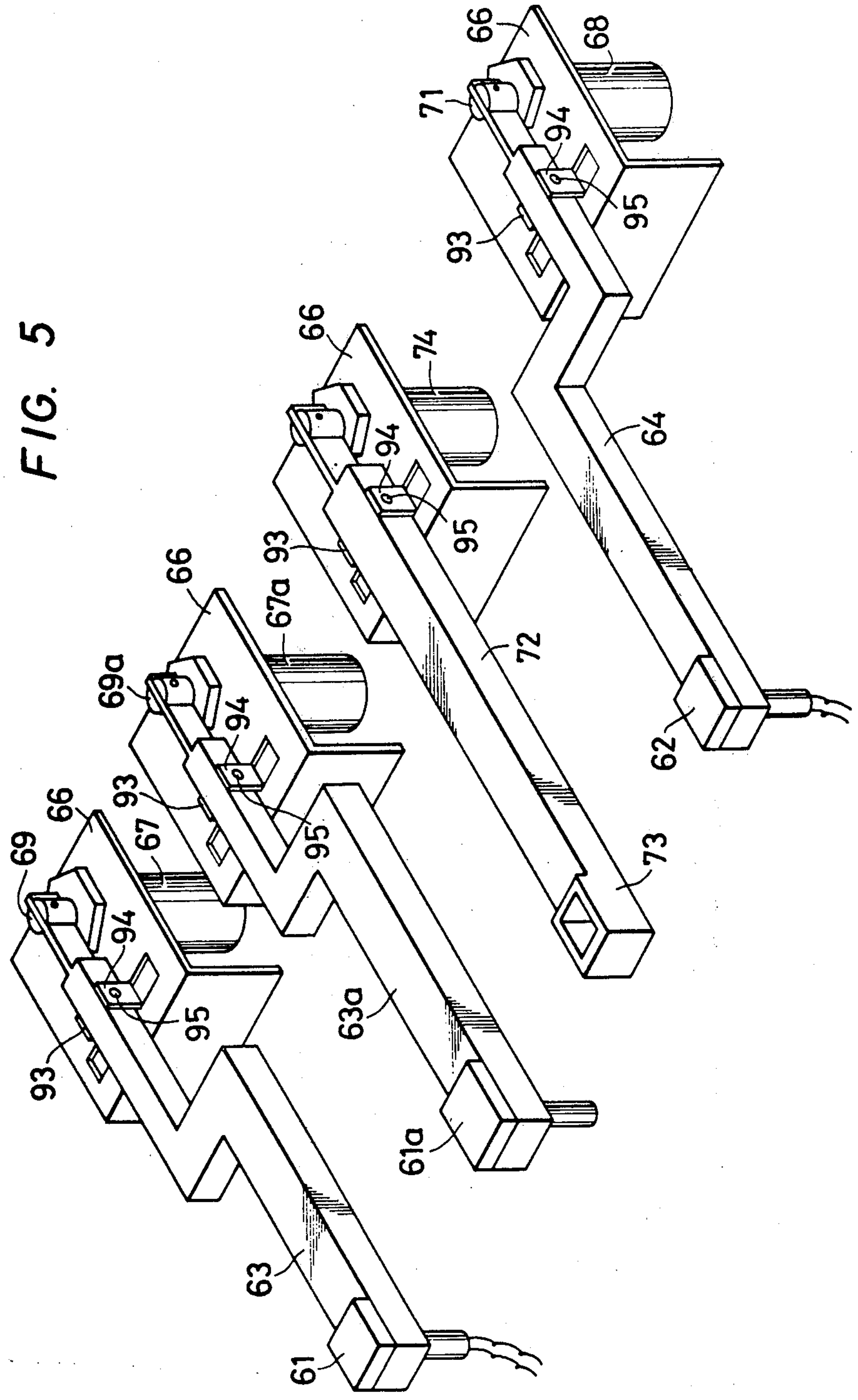
FIG. 5 is a perspective view showing, by way of example, a drive mechanism for a frame-shaped member of a heater.

In opposing relation to the recesses 57, **57*a* and 58 there are disposed a first heater 61 for preheating use, a cooler 61*a* for cooling use and a second heater 62 for heat-developing use. The heaters 61 and 62 and the cooler 61*a* are respectively carried at one end of rotary levers 63, 63*a* and 64 which extend in direction perpendicular to the vertical wall 51 of the photographing unit support 49, as shown in FIGS. 4 and 5. The rotary levers 63, 64 and 63*a* project out backwardly through an opening 65 made in the vertical wall 51 of the photographing unit support 49. The rotary levers 63, 64 and 63*a* are each pivotally mounted at the intermediate portion on a pin 95 bridged between a pair of lugs 93 and 94 cut to rise up from a bracket 66 secured to the back of the vertical wall 51. The rear end portions of the rotary levers 63, 64 and 63*a* are pivotally coupled with plungers 69, 71 and 69*a* of solenoids 67, 68 and 67*a* mounted on the brackets 66 respectively. By controlling the solenoids 67, 68 and 67*a*, the rotary levers 63, 64 and 63*a* are turned to urge the heaters 61 and 62 and the cooler 61*a* against the image forming sheet 19. The frames of the image forming sheet 19 are respectively held and fixed by the frame-like member of the recess 57 and heater 61, the frame-like member of the recess 59 and the heater 62, and the frame-like member of the recess 57*a* and the cooler 61*a*. The end faces of the heater 61 and 62 and the cooler 61*a* on the side of the image forming sheet 19 are of substantially the same size as each frame of the image forming sheet 19 but a little larger than the recesses 57, 58 and 57*a***.

In the above, one of each image forming sheet fixing means is described to be framed, but the fixing means is only to fix, during at least heat treatment, the image forming areas of the image forming sheet 19 which are subjected to preheating, cooling, exposure to light and heat-development; therefore, the fixing means may also be plate-like member or the like. From the viewpoint of uniform image processing, however, it is preferred that at least one of each fixing means is frame-shaped. In the case where a photosensitive material layer is formed on a substrate, it is preferred that the side of the photosensitive material layer of the image forming sheet is framed. The same is true of fixing means of exposure means described later.

As shown in FIGS. 2 and 3, the through hole 54 of the body tube member 53 is threaded, and a body tube 55 having screw threads formed on its outer peripheral surface and carrying the lens 18 is screwed into the through hole 54. By turning the body tube 55, the position of the lens 18 is adjusted relative to the image forming sheet 19 placed in contact with the end face of the body tube member 53, by which it is possible to perform fine control of the position where the image of a subject is formed. The position of the body tube 55, and accordingly the position of the lens 18 is fixed by tightening a nut 56 threadably engaged with the body tube 55. The size of the open end of the through hole 54 on the side of the image forming sheet 19 corresponds to the area of one frame of the image forming sheet 19, and the peripheral margin defining the open end is also used as a frame forming a part of the means for fixing the image forming sheet 19 during exposure.

As shown in FIG. 5, a rotary lever 72 is interposed between the rotary levers **63*a* and 64 in parallel relation thereto so as to ensure that during exposure the image forming sheet 19 is retained accurately at the position where the image of a subject is formed. The rotary lever 72 carries at one end a second hollow, frame-like member 73 for exposure use and is pivoted at the other end to a solenoid 74 mounted on a bracket 66, and further, the lever 72 is pivotally mounted, at its intermediate position, on a pin 95 bridged between a pair of lugs 93 and 94 cut to rise up from the bracket 66. By controlling the solenoid 74, the rotary lever 72 is turned, by which the image forming sheet 19 is urged by the second frame-shaped member 73 for exposure use against the frame-like peripheral margin of the through hole 54 of the body tube member 53 serving as the other frame-like member; consequently, the image forming sheet 19 is gripped between the both frame-like members and hence fixed in position. In this case, the second frame-shaped member 73 is made a little layer than the through hole 54 to assume that the image forming sheet 19 is pressed against the body tube member 53. The hollow, frame-shaped member 73 need not always be frame-shaped but may also be plate-shaped, but it is preferred to be hollow, frame-shaped in order to form, therein a path of light from a light source 162** for reading by a reader described later.

FIG. 3 illustrates a preferred arrangement in which recesses 57 and 57*a*, the through hole 54 and the recess 58 are equal in the center-to-center distance to the successive image forming areas or frames of the image forming sheet 19 and are disposed in alignment, and in which the preheating means, cooling means, exposure means and the heat-developing means are positioned respectively corresponding to the successive image forming areas.

FIG. 9A shows a modified form of the fixing means for fixing the image forming sheet 19 when the heating means is pressed against it. This fixing means comprises first and second frame-shaped members for gripping therebetween the image forming sheet 19. The second frame-shaped member, indicated by 146, for pressing the image forming sheet 19 is provided to surround the heater 62. Pressing the image forming sheet 19 by the second frame-shaped member 146 against the first frame-shaped member constituted by the end face of the recess 58 for heating use formed in the body tube member 53, one frame of the image forming sheet 19 is held by the both frame-shaped members on all sides. At the same time, even if temperature of the heater 62 becomes unnecessarily high in excess of a required value, heat diffusion to the adjoining frames can be prevented. Further, fixing of the image forming sheet 19 during heating permits uniform heating of the entire image forming area, ensuring to obtain the same sensitivity over the entire area and prevent deformation of the sheet 19 which otherwise would occur due to heating. This is effective for enhancement of sensitivity.

The second frame-shaped member 146, shown in FIG. 9A, can also be used with the cooler 61*a*. It is particularly preferred to actuate the heater 61 or cooler 61*a* after fixing in position the image forming sheet 19 with two frame-shaped members, i.e. fixing means composed of the second frame-shaped member 146 and the end face of the recess of the body tube member 53. Moreover, if the frame-shaped member for heating use, the body tube member, the frame-shaped member for heat-developing use and/or the frame-shaped member for cooling use respectively have a size of one frame of the image forming sheet and are fixed or formed as a unitary structure, the arrangement is simplified as compared with that in the case where they are provided and actuated separately.

In general, when the image forming sheet has a plurality of frames, they are arranged in alignment, and accordingly it is desirable that the at least the first heating means, the exposure means and the second heating means are also disposed in alignment; especially, it is preferred that at least four means of the first heating means, cooling means, exposure means and the second heating means are arranged in alignment.

The first heating means, the exposure means and the second heating means are usually provided in adjacent relation, but other means may also be interposed between them, as required.

The image forming area of the image forming sheet, after being activated by the first heating means to be rendered photosensitive, is moved by one frame and cooled by the aforesaid cooling means, and then shifted by one frame to an exposure position, where an image of a subject disposed on the subject holding part 13 is projected onto that frame of the image forming sheet 19 brought to the exposure position. To this end, a lamp support plate 114 is attached to the underside of the inner end portion of the optical image introducing part 12*a* obliquely above the subject holding part 13, as shown in FIG. 2. The lamp support plate 114 has mounted thereon lamp sockets 116 side by side for receiving long fluorescent lamps 118. The support plate 114 is arranged so that lights from the fluorescent lamps 118 are directed to the subject holding part 12*a*.

Reflected light of the subject placed on the subject holding part 13 moves towards the optical image introducing part 12*a* in a direction substantially perpendicular to the base 11. A light receiving window 121 is formed in the optical image introducing part 12*a* to open to the subject holding part 13. A hood 122 is attached to the window 121 to extend therefrom downwardly for shielding from unnecessary external light. Having entered in the optical image introducing part 12*a*, the reflected light from the subject strikes against a reflector 123 installed in the optical image introducing part 12*a* at an angle of substantially 45° to the base plate 11, and the reflected light is reflected by this reflector 123 at substantially right angles to move on backwards substantially in parallel with the base 11, thus entering into the housing 12. Above the body tube member 53, that is, on the side of a top panel 124 of the housing 12, a reflector 125 is disposed, and the light reflected from the reflector 123 is reflected by the reflector 125 to pass towards the projecting lens 18 of the body tube member 5 along its optical axis.

Also in the optical image introducing part 12*a* and the housing 12, there is provided a tubular light shielding box 126 which extends from the inner edge of the hood 122 surrounding the optical paths between the reflectors 123 and 125 and between the reflector 125 to a shutter 129.

In this manner, the image of the subject on the subject holding part 13 is reflected by the reflectors 123 and 125 and then projected by the lens 18 onto the image forming sheet 19. In order to determine the time for exposing the image forming sheet 19 to the image of the subject, there is provided on the light shielding box 126 on the side of the reflector 125 the shutter 129 for opening and closing the optical path 128 on the side of the projecting lens 18. The shutter 129 is driven, for example, by a solenoid 131 to open and close. The shutter 129 is opened by known automatic exposure detecting means (though not shown) for a right exposure time. Needless to say, the photosensitive material layer of the image forming sheet 19 confronts the through hole 54 of the body tube member 53.

A variety of tactics are considered for preventing the likelihood of accidental re-recording on an already recorded frame, that is, double image formation. One of effective methods for use with the equipment of this invention is to dispose a strip of a reflective material on at least one side, preferably on all sides of the subject holding part 13 substantially corresponding to one image forming area of the sheet 19 and to photograph the strip along with the subject. For example, as shown in FIG. 1, a highly reflective frame 133 of high reflection factor is formed on the marginal portion of the subject holding part 13 on all sides. That is, the subject holding part 13 is formed with a substrate of a color of low reflection factor, for example, black, and is surrouned with a square frame 133 made of a white material, aluminum foil or like high-reflection-factor material and whose inside dimension is equal to the outside one of the subject holding part 13 corresponding to one frame. A subject is placed within the highly reflective frame 133 and positioned relative to the frame 133, and a record of density depending on the reflection factor of the highly reflective frame 133 is always provided on the inner marginal portion of the image forming area of the image forming sheet 19 corresponding to the marginal portion of the subject. The highly reflective frame 133 may also be made to projecting from on one or all sides.

In order to detect the already recorded frame, there is disposed a double image formation preventive detector for checking whether or not the margin of the subject is photographed on the frame subject to the check, at a position spaced a distance of one frame of the image forming sheet 19 from the recess 57 of the body tube member 53 on the opposite side from the through hole 54. This double image formation preventive detector is composed of, for example, a photo diode or like light emitting device 134 and a photo transistor or like photo detector 135 which are provided with the image forming sheet 19 interposed therebetween.

The light emitting device 134 is mounted on an extension of the body tube member 53, whereas the photo detector 135 is supported so that it can be advanced and retracted relative to the image forming sheet 19 in the same manner as the heater 61, though not illustrated. Where the quantity of light received by the photo detector 135 is less than a predetermined value, it is decided that the frame is an already recorded one.

Figure 11:
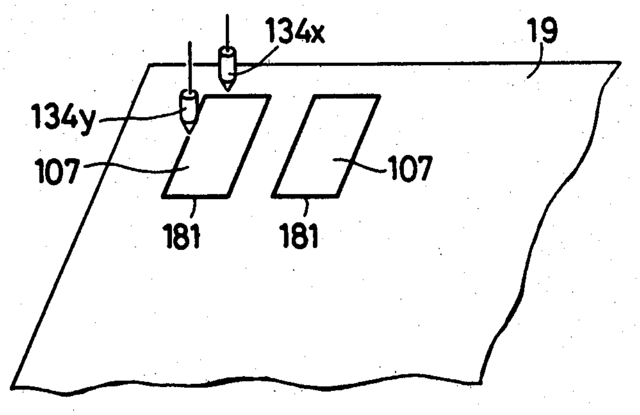
FIG. 11 is a diagram showing the relationship between frames of the image forming sheet and double exposure checking elements.

Next, the double image formation preventive means will be described in more detail. For example, as shown in FIG. 11, in the case of an already recorded frame, there is formed around the frame 107 on the image forming sheet 19 a record frame 181 of high density corresponding to the highly reflective frame 133 of the subject holding part 13 described previously in respect of FIG. 1. Light emitting devices 134*x* and 134*y* are disposed opposite the X- and Y-direction parts of the record frame 181 respectively, and photo detectors 135*x* and 135*y* are arranged in opposing relation to the light emitting devices 134*x* and 134*y* respectively although they are in the shadow of the image forming sheet 19 in FIG. 11.

Figure 12:
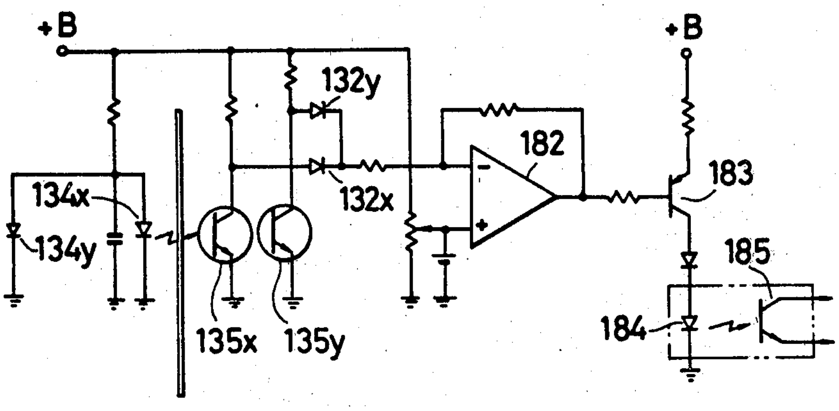
FIG. 12 is a circuit diagram illustrating an example of a double image formation preventive means.

The light emitting devices 134*x* and 134*y* are disposed opposite to the photo detectors 135*x* and 135*y* respectively corresponding thereto, with the image forming sheet 19 interposed therebetween, as shown in FIG. 12. In this example, the photo detectors 135*x* and 135*y* are photo transistors, whose collectors are respectively connected to one input terminal of a comparator 182 via diodes 132*x* and 132*y* forming an OR circuit, the other input terminal of the comparator 182 being supplied with a reference voltage.

When either one of the photo detectors 135*x* and 135*y* happens to confront the record frame 181, the photo detector output supplied to the comparator 182 increases higher than the reference voltage, and the comparator 182 provides a low-level output. The low-level output is applied to a PNP transistor 183 to conduct it, and a light emitting diode 184 is lighted, with the result that a photo detector 185 combined with the diode 184 to constitute a photo coupler is given information indicating that the frame is an already recorded one.

In the case where a pair of photo detector and light emitting device for detecting the record frame is provided for each of the X- and Y-directions of the record frame 181 as described above, even if the pairs of photo detectors and light emitting devices are a little out of position relative to the image forming sheet 19, at least one of the pairs confronts the record frame 181, ensuring the detection of the record frame.

In the above, use is made of transmitted light through the record frame 181 photographed on the image forming sheet 19 for preventing the double image formation, but it is also possible to employ reflected light from the record frame 181. Also it is possible to use transmitted light through or reflected light from an image photographed in the frame without providing and photographing the highly reflective frame 133. This double image formation preventing means is preferred to be disposed in alignment with the first heating means, the exposure means and the second heating means; in particular, it is preferred that the double image formation preventing means, the first heating means, the cooling means, the exposure means and the second heating means are arranged in alignment.

When the image forming sheet 19 has been moved in the X-axis direction to bring the frame to be recorded to the position of the double image formation preventing means, as shown in FIG. 3, it is checked by the light emitting device 134 and the photo detector 135 whether the frame is an already recorded one or not. Where it is detected that the frame is unrecorded, instructions are given to image forming sheet transfer means, and the image forming sheet 19 is moved a distance of one frame to the preheating position, where the frame is heated for activation. The frame of image forming sheet 19, thus rendered photosensitive by activation, is then brought to the cooling position, where the preheated frame is subjected to cooling. The frame of the image forming sheet 19, thus cooled after being activated, is further moved to the exposure position, where the image of a subject is projected to the frame. The thus exposed frame is then shifted a distance of one frame to the heat-developing position, where the latent image carried by the frame is developed by heating, thus completing recording on one frame.

In the present invention, it is preferred, for uniform image formation over the entire area of each frame, to provide pressurizing means so that when the preheating or heat-developing means is a high-temperature solid body, or when the cooling means is a solid body, a fluid pressure can be applied to the heated or cooled part of the image forming sheet on the opposite side from the solid-body means.

The pressurization using fluid pressure is performed after or at the same time as the image forming sheet is fixed in position by the fixing means, preferably while the abovesaid solid-body means is in contact with the image forming sheet. As a fluid for this purpose, a gas is suitable; in particular, pressurized air is preferred. By uniformly pressurizing at least one image forming area of the image forming sheet with the fluid towards the heating or cooling solid body, the entire image forming area is closely contacted with the solid body surface under a uniform contact pressure, and hence is heated or cooled uniformly. As a consequence, uniform preheating makes the image forming area photosensitive all over it, uniform heat-development or cooling provides a sensitivity rise without dispersion, thus ensuring image formation of excellent reproducibility. Further, it is possible to avoid heat deformation of the image forming area which is caused by pressurization and heating of the image forming sheet by the heaters during heating. It is desirable that the pressure applied to the image forming sheet by pressurization with fluid is in the range of 100 to 1000 $mmH_2O$.

Figure 7:
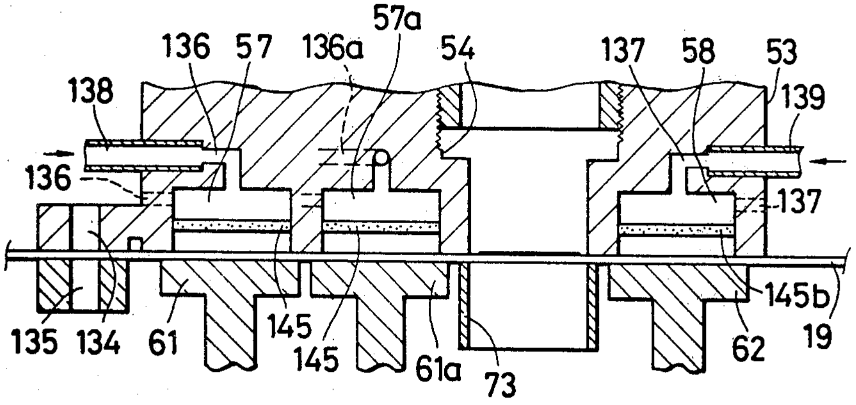
FIGS. 7, 7A and 7B are cross-sectional views respectively illustrating examples of the body tube portion.

As a preferred example of the pressurizing means, gas inlet ports 136, 136*a* and 137 are respectively formed in the body tube member 53 to extend from the bottoms of the recesses 57, 57*a* and 58 to the outside, as shown in FIGS. 3 and 7. The gas inlet ports 136, 136*a* and 137 are respectively connected via pipes 138, 138*a* and 139 to bellows 141, 141*a* and 142 serving as pressurized gas sources. To the bellows 141, 141*a* and 142, plungers of plunger solenoids 143, 143*a* and 144 are pivotally coupled at one end, and by energization of the plunger solenoids the bellows are contracted to supply air therefrom to the recesses 57, 57*a* and 58 via the pipes respectively corresponding thereto.

An arrangement for expanding and contracting the bellows 141 is such, for example, as shown in FIG. 3. The bellows 141 is fixed at one end to a mounting plate 301 secured to the base plate 22, and the solenoid 143 is also mounted to a mounting plate 302 fixed to the base plate 22. By energization of the solenoid 143, one end of a link 303 is turned about a pin 306 bridged between a pair of lugs cut to rise up from the mounting plate 302, pressing the other end of the bellows 141 towards the mounting plate 301 to contract the bellows 141. Upon de-energization of the solendoid 143, the bellows 141 is expanded by the spring force of the solenoid 143 to return to its original position. The bellows 141*a* and 142 are also expanded and contracted by the same arrangement as described above. As the pressurized gas source, a pressure pump is preferred other than the bellows, and in such a case, pressure can properly be applied to each of the pressure by driving the pump.

FIG. 7 is a cross-sectional view showing, on an enlarged scale, the state in which the heaters 61 and 62, the cooler 61*a* and the second frame 73 for exposure use are urged against the body tube member 53 with the image forming sheet 19 gripped therebetween. When air pressure is applied to the recesses 57, 58 and 57*a* in the state that the image forming sheet 19 is pressed against the body tube member 53 by the heaters 61 and 62 and the cooler 61*a*, those areas of the image forming sheet 19 underlying the recesses 57, 58 and 57*a* are urged uniformly against the heaters 61 and 62 and the coller 61*a*; accordingly, the image forming sheet 19 is heated and cooled uniformly all over these areas. The sizes of the recesses 57, 58 and 57*a* are selected larger than the size of one frame including its margin, so that the marginal portions of the recesses 57, 58 and 57*a* do not touch the image forming area, that is, the marginal portion of each recess lies on the outside of a projected image of the highly reflective frame 133 for double image formation preventive use.

In the example of FIG. 7, pressure distributing plates 145, 145*a* and 145*b* are respectively disposed in the recesses 57, 57*a* and 58 at their intermediate portion in opposing relation to the image forming sheet 19. These plates may be made of a sintered metal, for example, of brass of stanless steel, or sponge or like porous material, or they may also be plates, each having perforations distributed substantially uniformly over the entire area. In short, air pressure supplied from the inlets 136, 136*a* and 137 is distributed by the plates 145, 145*a* and 145*b* to be applied uniformly to the image forming sheet 19.

But the abovesaid distributing plates can be dispensed with by a modification of the positions of the pressurized gas inlet ports, that is, forming the pressurized gas inlet ports 136, 136*a* and 137 in the side walls of the recesses 57, 57*a* and 58, as indicated by the broken lines in FIG. 7, or spacing the gas inlet ports as far apart from the image forming sheet 19 as possible.

Figure 8:
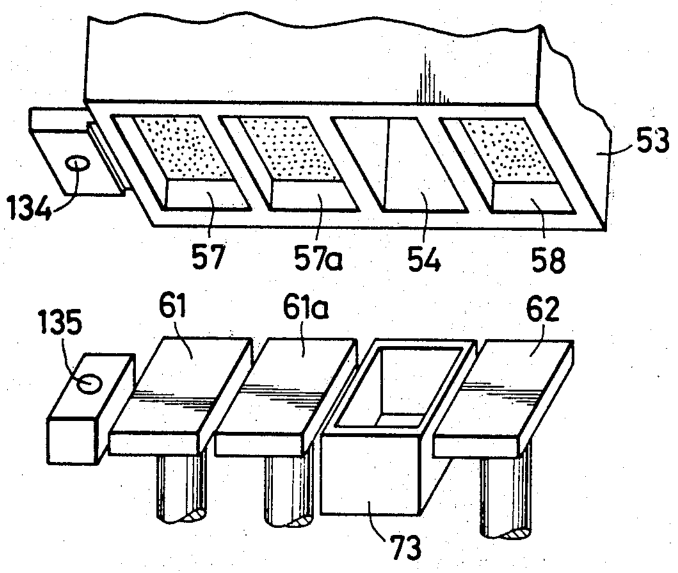
FIGS. 8 and 8A are respectively perspective views of frame-shaped members of the body member of FIGS. 7, 7B, as viewed from the side of an image forming sheet.

As the heating means and the cooling means, high-temperature solid bodies and a low-temperature solid body are especially preferred which are of the type that make direct contact with the image forming sheet during heating and cooling respectively. Further, it is desirable that the heaters and the cooler are of a size larger than the inside dimension of each of the recesses 57, 58 and 57*a* having the frame-shaped marginal portions on all sides but not so large as to overlap the adjoining frames and hold the image forming sheet 19 in combination with the frame-shaped marginal portion of each of the recesses 57, 58 and 57*a*. FIG. 8 shows, in perspective, the body tube member 53 and the side on which are provided the heaters 61 and 62, the cooler 61*a* and the second frame 73 for exposure use. If the body tube member 53 is made of a material of relatively high thermal conductivity, such as brass, then heat of the heaters 61 and 62 and the cooler 61*a* is absorbed into the body tube member 53 of large thermal capacity through the image forming sheet 19 at the marginal portions of the heaters and the cooler, ensuring avoid the influence of heating or cooling on the adjoining frames.

Figure 9:
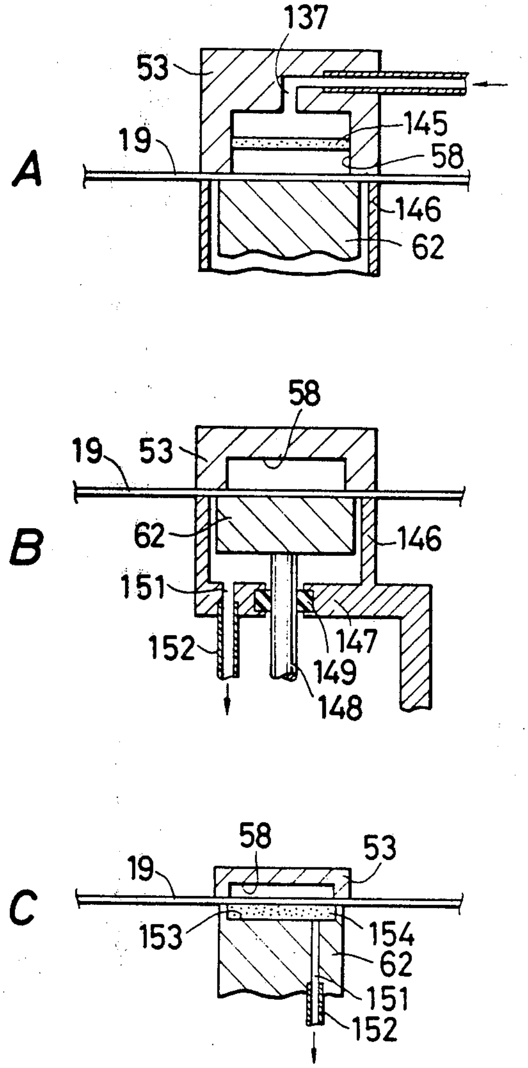
FIGS. 9A to 9C are cross-sectional views respectively showing other modified forms of the body tube member and a heater.

FIG. 9 illustrates modified forms of the means for unirormly heating or cooling one frame of the image forming sheet. In FIG. 9A, a second frame-shaped member 146 is provided around the heater 62 for pressing the image forming sheet 19 against the body tube member 53. The provision of such frame-shaped member prevents thermal diffusion to the adjoining frames can be prevented even if the temperature of the heater 62 rises unnecessarily high and, combined with pressing of the image forming sheet 19 against the body tube member 53 by the heater 62, achieves double seal so that even when the pressure of the pressurized gas increases, no gas escapes from between the image forming sheet 19 and the body tube member 53, thereby ensuring to perform more uniform heating.

In the foregoing, a positive pressure is applied to the image forming sheet 19 for pressurization, but it is also possible to apply a negative pressure to the sheet 19 from the opposite side to provide the same results as those obtainable with pressurization. FIG. 9B shows, by way of example, an arrangement for such operation, in which the gas inlet port 137 formed in the body tube member 53 to open to the recess 58 in the foregoing is left out, the open end of the second frame-shaped member 146 on the opposite side from the image forming sheet 19 is covered with a plate 147, and a heater driving shaft 148 projects out of the plate 147 through a gas-tight packing 149. A suction port 151 is formed in the plate 147, and air in the second frame-shaped member 146 is sucked through a pipe 152 coupled with the suction port 151. As a consequence, the internal pressure of the second frame-shaped member 146 is rendered negative relative to the external pressure, resulting in the image forming sheet 19 being uniformly urged against the heater 62. In FIG. 9C, since the image forming sheet 19 is attracted to the side of the heater in such a case of applying a negative pressure to the image forming sheet as described above, a recess 153 of substantially the same size as the recess 58 of the body tube member 53 is formed in the surface of the heater 62 on the side of the image forming sheet 19. A porous thermal medium 154 of high thermal conductivity is packed into the recess 153, and a suction port 151 is formed in the heater 62 to open to the recess 153. By sucking air from the suction port 151, the image forming sheet 19 is attracted to the heater 62, and the heat of the heater 62 is transmitted via the thermal medium 154 to the image forming sheet 19. As the thermal medium 154, use can be made of sintered metal of stainless steel or the like. FIGS. 9A to C show heat-development means, but such arrangements can also be applied to the preheating or cooling means. Although the above has made reference to the pressurizing means employing a negative pressure, pressurization using a positive pressure is rather practical in terms of resulting picture quality.

Heating or cooling of the image forming sheet can be performed by a heating method of contacting a high-temperture gas with the sheet or exposing the sheet to irradiation by infrared or far infrared rays, or a cooling method of contacting a low-temperature gas with the sheet as well as the above-described method of contacting a high temperature or low-temperature solid body directly with the image forming sheet. As the method of contacting the high-temperature or low-temperature gas with the image forming sheet, there can be mentioned a method of blowing the high-temperature or low-temperature gas against the image forming sheet, and a method that a high-temperature or low-temperature solid body is disposed in adjacent but spaced relation to the image forming sheet to heat or cool gas present in the very narrow air gap defined between the solid body and the sheet. It is also possible to adopt the combined use of the method utilizing a solid body and the method utilizing gas or infrared rays or the like.

Figure 13:
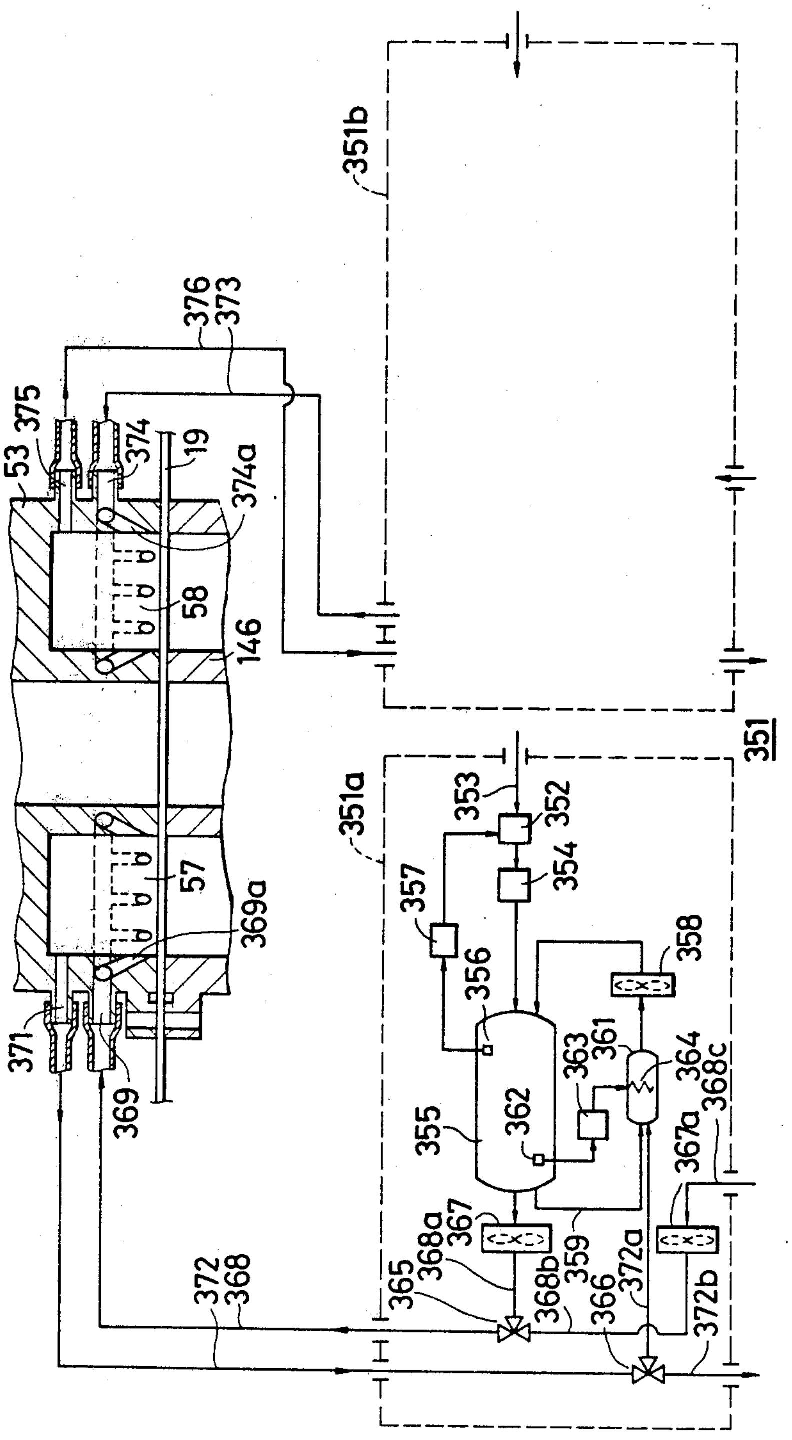
FIG. 13 is a schematic diagram showing control systems and air passages for heating with heated air and cooling with low-temperature air.

FIG. 13 shows, by way of example, an arrangement for blowing heated air or low-temperature air against the image forming sheet to heat or cool it. A heated air generator unit 351 is composed of generators 351*a* and 351*b*. In the generator 351*a*, air sucked therein through an air pipe 353 by an air pump 352 is normally sent through a dust collecting filter 354 into a heated air tank 355. In this case, the pump 352 is placed under control of an output part 357 of a switch 356 for detecting the pressure in the air tank 355, so that the pressure in the tank is maintained at a desired value. The air in the tank 355 is always blown by an air blower 358 into an air heating device 361 through an air pipe 359. A heating unit 364 in the heating device 361 is controlled by the output from an output part 363 of a temperature detecting element 362 placed in the tank 355, and air heated to a predetermined temperature is circulated from the heating device 361 through the air blower 358 back to the air tank 355. In this manner, the air in the tank 355 is controlled to remain at a predetermined temperature.

When the image forming sheet 19 is heated or cooled, it is held between the body tube 53 and the second frame-shaped member 146 in advance.

In the case of preheating the image forming sheet 19, electromagnetic three-way valves 365 and 366 are opened to permit intercommunication between air pipes 368 and 368*a* and between air pipes 372 and 372*a* respectively, and an air blower 367 is driven, so that the heated air in the tank 355 is blown into the recess 57 from a jet 369*a* through the air blower 367, the air pipe 368*a*, the electromagnetic three-way valve 365, the air pipe 368 and the air inlet port 369, thus preheating the image forming sheet 19. Then, the air thus blown into the recess 57 is returned therefrom to the tank 355 through an air outlet port 371, the air pipe 372, the electromagnetic three-way valve 366, the air pipe 372*a*, the heating device 361 and the air blower 358.

By blowing such heated circulating air against the image forming sheet 19 from the jet 369*a*, the image forming sheet 19 is heat-activated to be rendered photosensitive. Next, when the image forming sheet 19 is cooled, the electromagnetic three-way valves 365 and 366 are opened to provide intercommunication between the air pipes 368 and 368*b* and between 372 and 372*b*, and the air blower 367 is driven. In this instance, air from the outside through an air pipe 368*a* passes through an air blower 367*a*, the air pipe 368*b*, the electromagnetic three-way valve 365, the air pipe 368 and the inlet port 369 and spouts into the recess 57 from the jet 369*a*, cooling the image forming sheet 19. The air thus blown into the recess 57 is exhausted to the outside through the outlet port 371, the air pipe 372, the electromagnetic three-way valve 366 and the air pipe 372*b*. In this manner, air sucked in from the outside is blown against the imag forming sheet 369*a* from the jet 369*a*, by which the image forming sheet 19 is cooled after being preheated.

The generator 351*b* of the heated air generator unit 351 is identical in construction with the generator 351*a* described above. Heated air from the generator 351*b* passes through an air pipe 373 and an air inlet port 374 and spouts into the recess 58 to heat the image forming sheet 19, thereafter returning to the generator 351*b* through an air outlet port 375 and an air pipe 376. In the manner described just above, the heated, circulating air from the generator 351*b* is brown against the image forming sheet 19 from the jet 374*a*, resulting in the image forming sheet 19 being heat-developed. After the heat-developing process, the image forming sheet 19 may also be cooled by blowing thereagainst external air from the jet 374*a* in the same manner as in the case of cooling after activation by heating.

The temperature of the heated air produced by the generator 351*a* is usually controlled to remain a predetermined value within the range of 80° to 200° C. which is a little higher than the temperature to which the image forming sheet 19 is to be heated. Similarly, the temperature of the heated air produced by the generator 351*b* is usually retained at a predetermined value within the range from 100° to 220° C.

Figure 14:
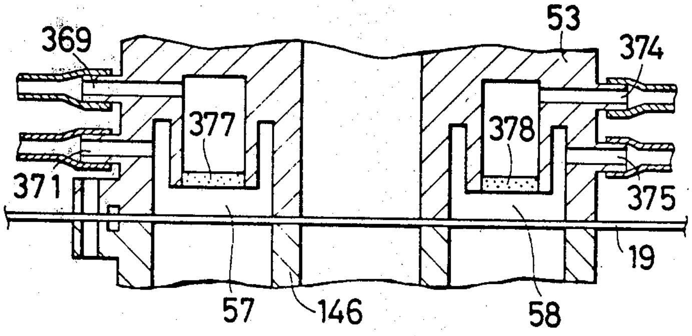
FIG. 14 is a cross-sectional view illustrating another example of the body tube member in the case of heating with heated air and cooling with low-temperature air.

As the air for cooling use, external air of room temperature is employed to cool the image forming sheet to a temperature between 60° C. to room temperature. It is also possible to control the cooling temperature at a predetermined value below 60° C., for example, in the range of 0° to 60° C. by using a cooling device. Also it is possible to adopt such an arrangement as shown in FIG. 14 in which the heated air and the air for cooling having passed through the inlet ports 369 and 374 are respectively blown out into the recesses 57 and 58 through distributing plates 377 and 378 made of a porous material. Further, the heated air and the cooling air may also be blown against the image forning sheet 19 on the opposite side from the body tube member 53. In such a case, frame shaped members are provided in opposing relation to the recesses 57 and 58 across the image forming sheet 19, and heated air and cooling air are respectively sent into the frame-shaped members and blown against the image forming sheet, if necessary, through distributing plates.

Figure 15:
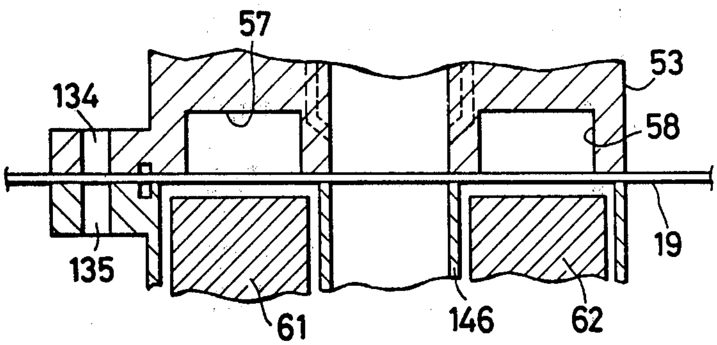
FIG. 15 is a cross-sectional view illustrating another example of the body tube member in the case of heating with gas.

FIG. 15 illustrates a modified form of the arrangement for heating the image forming sheet 19 by contacting therewith a gas. In FIG. 15, high-temperature solid bodies are brought as close to the image forming sheet 19 as possible but not moved into contact therewith. The image forming sheet 19 is held between the body tube member 53 and the second frame-shaped member 46, and during operation the heaters 61 and 62 are brought into close proximity with the image forming sheet 19 to heat is. It is believed that heating of the sheet 19 is performed by a combination of conduction, convection and radiation.

Figure 16:
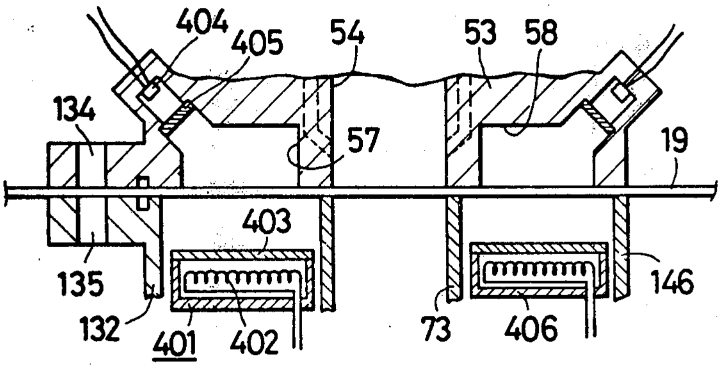
FIG. 16 is a cross-sectional view showing another example of the body tube member in the case of heating with infrared rays.

As the heating means, infrared or far infrared rays can also be employed. For example, as depicted in FIG. 16, second frame-shaped members 132 and 146 are respectively disposed opposite the recesses 57 and 58 of the body tube member 53 across the image forming sheet 19. The second frame-shaped members 132 and 146 have disposed therein infrared ray generators 401 and 406 respectively. The infrared ray generator 401 comprises, for example, a heater 402 incorporated therein and an infrared radiation member 403 as of lanthanum, chromite or the like which is disposed on the side of the image forming sheet 19. Upon energization of the heater 402, infrared rays are radiated to irradiate the image forming sheet 19 to heat it. In the recess 57, an infrared ray detector 404 is provided, which detects infrared rays from the image forming sheet 19 to detect its temperature. In such an instance, a filter 405 may also be provided for intercepting wavelength components of infrared rays which are not absorbed by the image forming sheet 19, that is, the wavelength components of infrared rays unnecessary for heating the sheet 19, thereby to ensure detection of only the component having heated the sheet 19. The other infrared ray generator 406 may be identical in construction with the above-described one 401. The second frame-shaped members 132 and 146 can be formed as a unitary structure with the second frame-shaped member 73 positioned opposite the through hole 54 of the body tube member 53.

In the case where a solid body for heating use is not brought into direct contact with the image forming sheet like the heating means shown in FIGS. 15 and 16, no deformation of the sheet is caused by the direct contact therewith of the solid body, and the surface of the solid body on the side of the image forming sheet need not be made smooth.

The above has illustrated the heating and the cooling means. As the first heating means for preheating use and the second heating means for heat-developing use, different types of heating means can be employed, but it is preferred in terms of design to employ heating means of the same kind; in general, it is preferred to employ the heating means of the type contacting a heating solid body with the image forming sheet. Preferred ones of the cooling means are those of the type contacting a solid body directly with the image forming sheet and the type contacting a gas with the sheet, regardless of the heating means. Further, it is desirable to fix an image forming area of the image forming sheet by fixing means in the course of the cooling process.

Figure 7A:
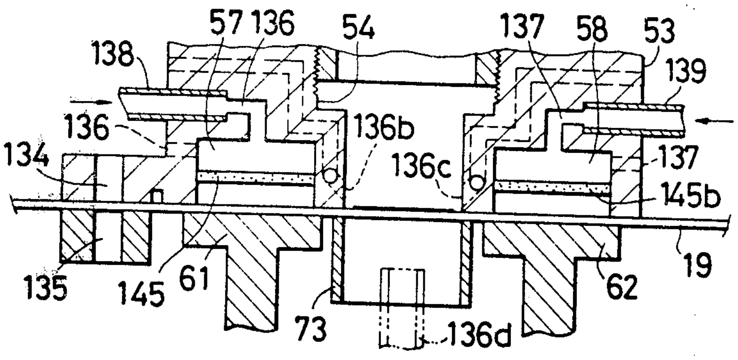
Figure 7B:
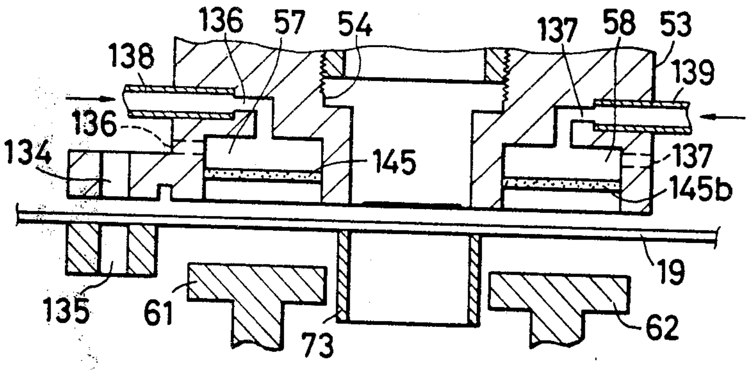
Figure 8A:
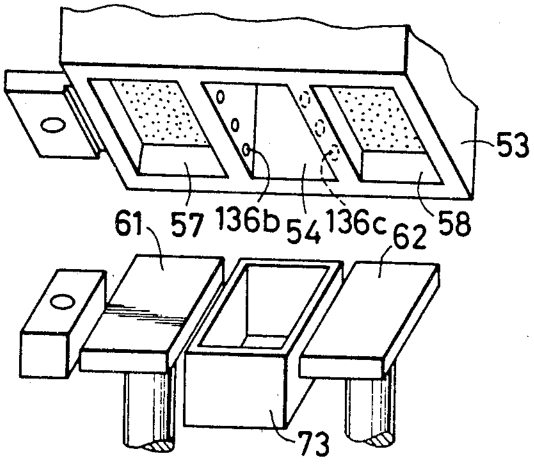

Next, a description will be given of a specific operative example in which the position of the cooling means and the time of its operation are different from those described in the foregoing. The cooling after preheating can also be performed without providing the cooler **61*a* and the recess 57*a*. For example, as shown in FIGS. 7A and 8A, air of room temperature or cooled air is sent by an air blower (not shown) into the through hole 54 through inlets 136*b* formed in the peripheral surface of the through hole 54 and blown against the image forming sheet 19, and then discharged from outlets 136*c* respectively formed in the peripheral surface of the through hole 54 in opposing relation to the inlets 136*b*. It is also possible to adopt such an arrangement as indicated by the one-dot chain lines in FIG. 7A in which, on the opposite side from the body tube member 53 with respect to the image forming sheet 19, a pipe 136*d* is disposed in the second frame-shaped member 73 centrally thereof and in parallel thereto so that air of room temperature or cooled air is blown against the image forming sheet 19 from the pipe 136*d*. In this case, cooling may also be carried out on the side of the body tube member 53 at the same time. Also it is possible to employ such an arrangement as illustrated in FIG. 7B in which after the heater 61 is moved out of contact with the image forming sheet 19 following preheating of its image forming area air in the bellows 141 is sent in the recess 57 and directed to the image forming sheet 19** to cool it.

The embodiment illustrated in FIGS. 1 to 3 is designed so that information recorded in the frame of the image forming sheet 19 placed at the exposure position is projected on an enlarged scale for reading. To this end, a light source box 161 is mounted on the base plate 22 below the second frame shaped member 73 for exposure use in FIG. 2, for instance. In the light source box 161 there is provided a light source 162 for reading, and, as required, a cooling fan 163 is disposed on the side of the base plate 22. Rays of light from the light source 162 are condensed by a concave mirror 164 and directed to a reflector 165 in parallel relation to the base plate 22 and then turned thereby to the side of the exposure position. The optical axis of the light thus turned at right angles is aligned with the axis of the second frame-shaped member 37 and the through hole 53. Above the reflector 165 is provided a condensing lens 166, and the light condensed by the lens 166 passes through the frame-shaped member 73 and irradiates that area of the image forming sheet 19 which underlies the through hole 54. The transmitted light from the image forming sheet 19 passes through the projecting lens 18 and is guided to the side of the reflector 125.

Figure 10:
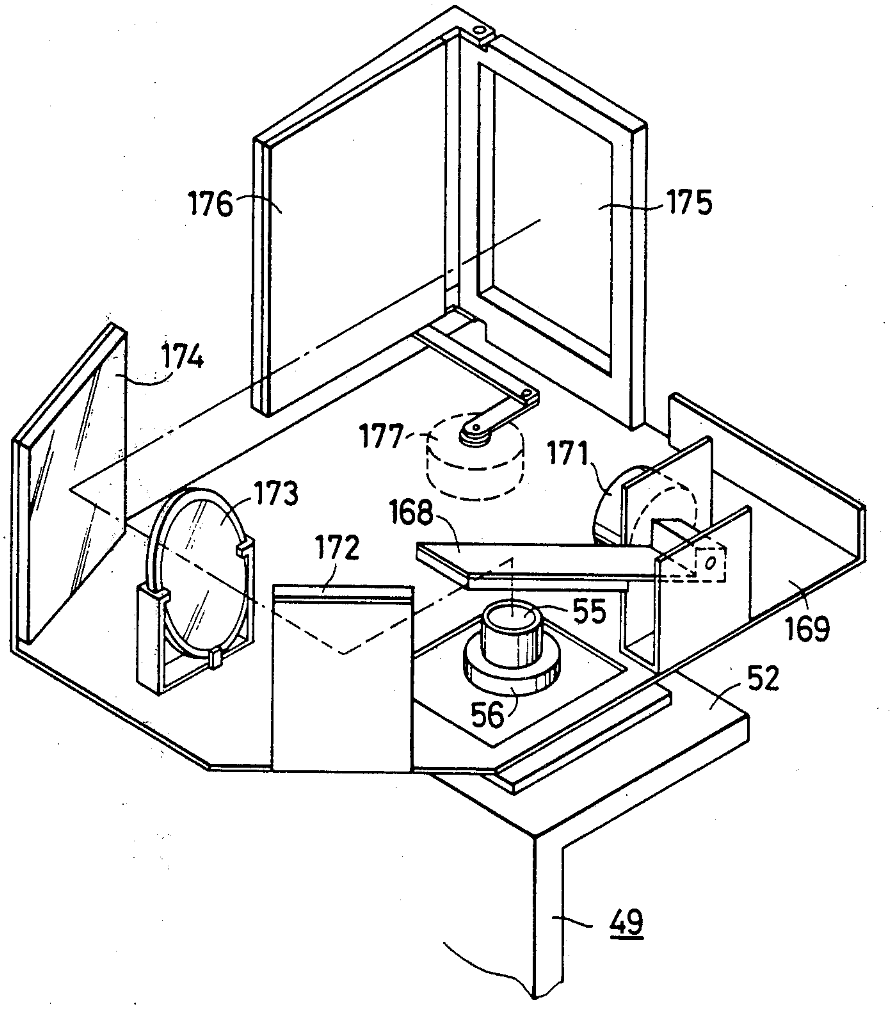
FIG. 10 is a perspective view showing means for forming an optical path for reading use.

Between the shutter 129 and the body tube member 53 is provided a rotary mirror 168 which can be moved into or out of the optical path of the image of a subject, as shown in FIG. 10. The rotary mirror 168 is pivotally mounted on a mounting plate 169 fixed to the front panel 15 of the housing 12. The rotary shaft of the rotary mirror 168 is driven by a solenoid 171. During recording the rotary mirror 168 is held away from the optical path between the reflector 125 and the body tube member 53, as indicated by the solid lines in FIG. 2. During reading the rotary mirror 168 is turned to be inserted in the abovesaid optical path at an angle with respect thereto, as indicated by the chain lines in FIG. 2. Accordingly, the light having passed through the body tube member 53 is reflected by the rotary mirror 168 and further reflected by a reflector 172 mounted on the mounting plate 169, passing substantially in parallel with the front panel 15, and enlarged by an enlarging projecting lens 173, thereafter being bent by a reflector 174 substantially at right angles to be projected on the screen 175 provided on the front panel 15 of the housing 12. During recording the screen 175 is covered with a cover plate 176 so that no unnecessary light enters from the screen 175. During reading the cover plate 176 is removed by the control of a solenoid 177, and a recorded image in the image forming area positioned right under the through hole 54 is projected onto the screen 175 on an enlarged scale.

There is a difference between the optical path from the subject holding part 13 to the image forming sheet 19 and the optical path from the image forming sheet 19 to the screen 175. In such a case as described above, the record on the image forming sheet 19 is clearly projected by the enlarging projecting screen 173 onto the screen 175 on an enlarged scale. The screen 175 need not always be provided on the front panel 15 but may also be disposed at any other convenient location. At any rate, by incorporating the enlarging projecting lens 173 in the optical path for enlarged projection use, information recorded in an arbitrarily selected one of frames on the image forming sheet 19 can be projected on an enlarged scale without transferring the image forming sheet 19 to a position different from that for photographing, or without mounting the image forming sheet 19 on a separate projector. Therefore, during recording information can be read immediately after being recorded. In order to ensure that during reading one frame of the image forming sheet 19 assumes a right position, the image forming sheet 19 is pressed by the second frame-shaped member 73 against the marginal portion of the through hole 54 of the body tube member 53.

As will be understood from the above, the addition of the enlarged projection means requires at least a light source, a condensing lens (or mirror) and a screen, and the other elements can be dispensed with as required.

A unit for controlling transfer, heating and exposure of the image forming sheet 19, application of a fluid pressure to the sheet 19 and so forth is disposed in a casing 205 placed in the housing 12 at the left-hand side, as viewed in FIG. 3. The abovesaid control is performed using the so-called microcomputer, for example. Temperature control for the heaters 61 and 62 is also achieved by the microcomputer, whereas temperature control of the cooler 61*a* may also be natural cooling one. In this case, the effect of natural cooling is enhanced by the provision of a radiator fin on the cooler. Also it is possible to utilize an arrangement for sending air or water in the cooler or cooling the cooler with an electronic cooling element.

Figure 17:
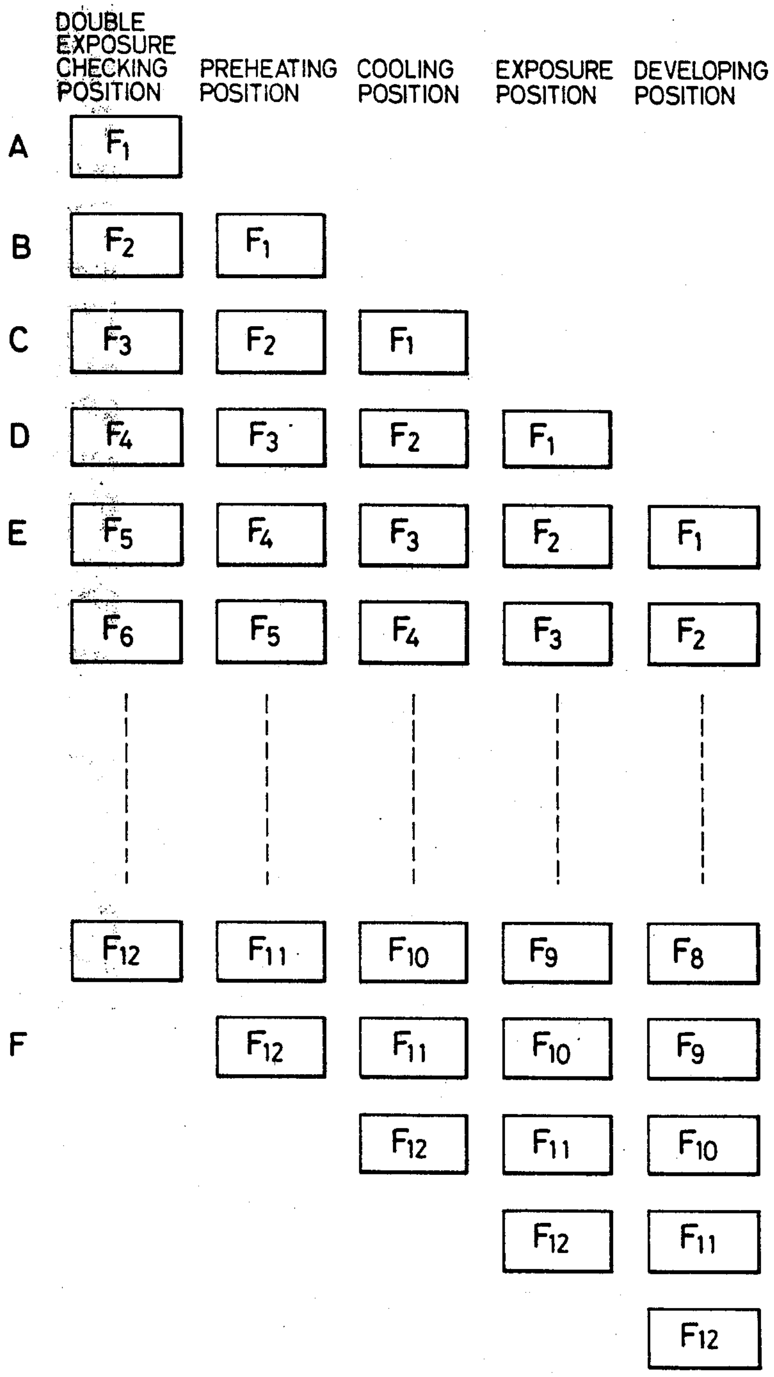
FIG. 17 is a diagram showing the relationships between frames of the image forming sheet and a double exposure checking, a preheating, a cooling, an exposure and a heat-development position during successive recording.

In the case where the double image formation preventive means, the preheating means, the cooling means, the exposure means and the heat-development means are aligned at the same intervals as those of the image forming areas of the image forming sheet 19, it is possible not only to perform recording one one image forming area of the sheet 19 by successively subjecting it to the respective processes but also to achieve higher-speed recording by simultaneously subjecting a plurality of image forming areas to any one of the respective steps. In the latter case, when a first designated frame $F_1$ is brought to a double exposure checking position, as shown in FIG. 17A, it is checked whether the frame $F_1$ is an already recorded one or not. If not, the image forming sheet is moved by one frame in the X-axis direction to bring the designated frame $F_1$ to the preheating position, as depicted in FIG. 17B. While the frame $F_1$ is preheated, the next frame $F_2$ is checked for double exposure at the same time. Where there is no fear of double exposure of the frame $F_2$, the image forming sheet is moved by one frame in the X-axis direction, bringing the frames $F_1$ and $F_2$ to the cooling position and the preheating position respectively, and the next frame $F_3$ to the double exposure checking position, as shown in FIG. 17C. The frames $F_1$ and $F_2$ are cooled and preheated respectively, and at the same time the frame $F_3$ is checked for double exposure.

If it has turned out that the frame $F_3$ is not already recorded, the image forming sheet is further moved by one frame in the X-axis direction, bringing the frames $F_1$, $F_2$ and $F_3$ to the exposure position, the cooling position and the preheating position respectively, and the next frame $F_4$ to the double exposure checking position, as shown in FIG. 17D. The frames $F_1$, $F_2$ and $F_3$ are simultaneously subjected to the exposure, the cooling and the preheating process respectively, and at the same time the frame $F_4$ is subjected to the double exposure checking process. If the frame $F_4$ is found to be unrecorded, the image forming sheet is further shifted by one frame in the X-axis direction to provide such a state as shown in FIG. 17E, in which the first frame $F_1$ lies at the developing position, the second frame $F_1$ lies at the developing position, the second frame $F_2$ at the exposure position, the third frame $F_3$ at the cooling position, the fourth frame $F_4$ at the preheating position and the next frame $F_5$ at the double exposure checking position. The frames $F_1$, $F_2$, $F_3$ and $F_4$ are simultaneously subjected to the development, the exposure, the cooling and the preheating process respectively, and at the same time the frame $F_5$ is subjected to the double exposure checking process. Thereafter, each time the image forming sheet is similarly shifted by one frame in the X-axis direction, five frames are respectively checked for double exposure, preheated, cooled, exposed, and heat-developed substantially at the same time. In the case of completing such successive recording, when a last frame $F_{12}$ is brought to the preheating position, the preheating, the cooling, exposure, and the development process take place in parallel, but no double exposure checking process is performed, as shown in FIG. 12F. Then, the image forming sheet is moved by one frame in the X-axis direction, the cooling, the exposure, and the development process take place in parallel; thereafter the frames still in the course of recording are similarly subjected to the remaining processes one after another.

Where use is made of the heating means and the cooling means depicted in FIG. 7A, after a frame designated for recording is shifted to the preheating position and then to the exposure position, the second frame-shaped member 73 for exposure use is urged against the image forming sheet, and at the same time the solenoid for the cooling air supply bellows is energized to cool the preheated frame, and then the solenoid for the shutter is energized. The arrangement shown in FIG. 7A permits simplified structure of the body tube member 53 and requires less number of times of shifting the image forming sheet 19 as compared with the arrangement of FIG. 7. With the arrangement of FIG. 7B, after the heater 61 for preheating use is moved out of contact with the image forming sheet 19, air is passed from the recess 57 to the sheet 19 to cool it. Also in this case, the structure of the body tube member 53 is simple and the number of times of shifting the image forming sheet 19 is small as compared with in the case of the arrangement of FIG. 7. Moreover, since the outlet 136*b* and the inlet 136*c* provided in the arrangement of FIG. 7 are not needed, the structure of the body tube member 53 is simplified by that.

The conditions for recording in the foregoing embodiments are as follows: The preheating is conducted at a temperature in the range of 80° to 130° C. for a suitable time between 0.5 and 12 sec.; the exposure after rendering the image forming sheet photosensitive is performed under illumination of, for example, 2000 to 10000 luxes for about 0.5 to 12 sec. or so; and the heat-development is effected at a temperature of, for example, 100° to 150° C. or so for a suitable time in the range of 0.5 to 12 sec.

Figure 18:
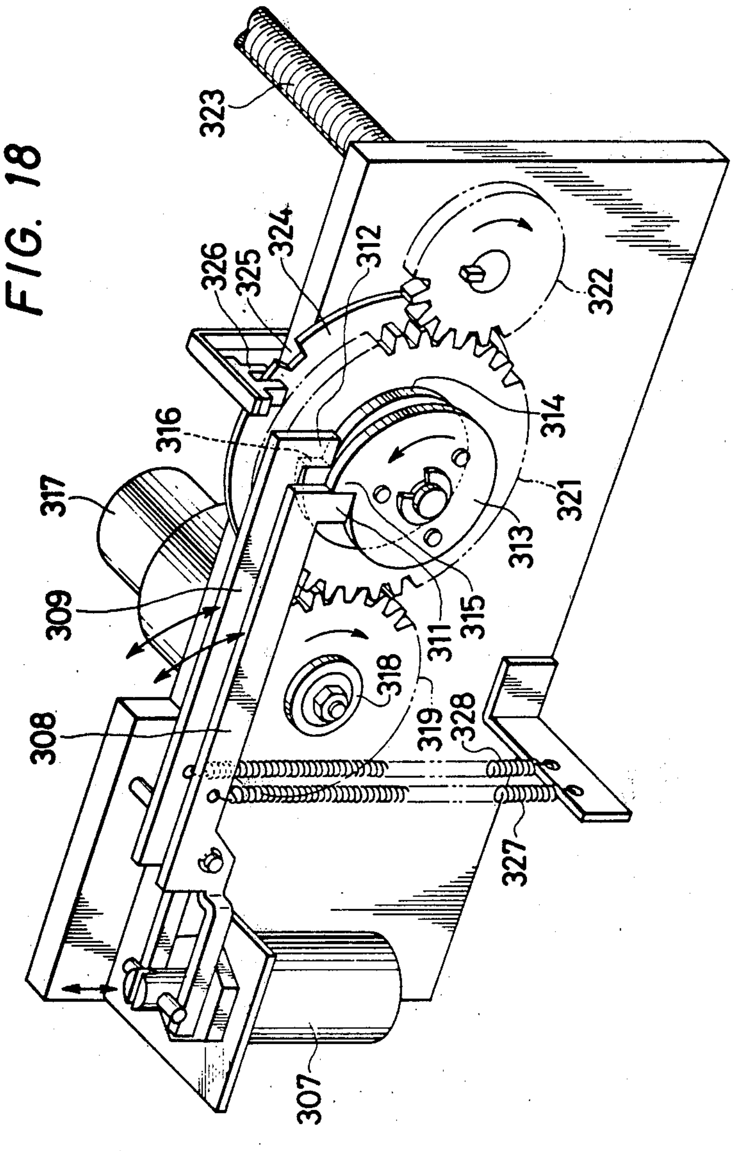
FIG. 18 is a perspective view illustrating an example of utilizing ratchet wheels for positioning of the image forming sheet.

In the above, a step motor is employed for driving, positioning and stopping of the image forming sheet transfer means, but other methods may also be employed. For example, as described hereunder, use can also be made of transfer means which is driven by an ordinary motor, positioned by a signal produced by a combination of an encoder and a photo sensor, and stopped by a latch. That is, as shown in FIG. 18, claws 311 and 312 of a forward revolving bar 308 and a backward revolving bar 309 are respectively disengaged from latches 315 and 316 of a forward revolving ratchet wheel 313 and a backward revolving ratchet wheel 314 by the action of a solenoid 307. Next, a motor 317 is driven to drive a rotary shaft 323 through a clutch 318 and gears 319, 321 and 322. An encoder 324, the gear 321 and the ratch wheels 313 and 314 are fixed relative and formed as a unitary structure with one another and designed so that upon each rotation, the drive shaft 323 is driven corresponding to the distance of movement of the image forming sheet for one frame. When the gear 321 rotates by half, a notch 325 of the encoder 324 is detected by a photo sensor 326. This detection signal deenergizes the solenoid 307, and by the action of springs 327 and 328 the claws 311 and 312 slide on the outer peripheral surfaces of the ratchet wheels 313 and 314 respectively. With further rotation of the motor 317, the latch 317 of the ratchet wheel 313 strikes against the claw 311 of the bar 308, and at the same time the claw 312 of the bar 309 strikes against the latch 316 of the ratchet wheel 314, preventing reversal of the gear 321 due to repulsion of the shock. At the same time, the rotary drive shaft 323 is stopped from rotating. The motor 317 is timed to such an extent as to continue rotating for a while even after the gear 321 is stopped by the aforementioned detection signal from the photo sensor 326, and in this while overloading of the motor 317 is prevented by the clutch 318 until the motor 317 comes to rest after stopping of the gear 321. In this manner, the image forming sheet can be shifted and positioned with high accuracy; therefore, such a transfer mechanism as described above may also be employed.

Although the foregoing embodiments utilize the threaded shafts 33, 43 and 323 for shifting the image forming sheet, it is also possible to adopt a method using wires, a method using a rack and a pinion or a method using a chain. Of these methods, a method of having the image forming sheet in two dimensions of the X and Y directions is effective when the image forming sheet is a microfiche.

In the apparatus shown in FIGS. 4 and 5, the heater 61 for preheating, the cooler 61*a*, the heater 61 for development and the second frame-shaped member 73 for exposure and brought into and out of contact with the image forming sheet, but it is also possible to fix them and move the body tube member 53 into and out of contact with the image forming sheet. Generally, it is desirable to adopt such an arrangement as shown in FIG. 2 in which the side of the body tube member 53 is fixed and the heaters and the second frame-shaped member for exposure are made movable so that the image forming position for the image of a subject can easily be fixed. Moreover, the illustrated mechanism for bringing the heaters and so on into and out of contact with the image forming sheet is suitable for use in practice, but this mechanism may also be replaced with others. Also, the exposure means may be replaced with other means than the aforementioned, but at least a projecting lens for projecting the image of the subject onto the image forming sheet and a shutter are needed, and the other elements can be modified according to the position of the subject being placed; for example, the subject may also be placed on the top of the housing to face downwards. Further, the conditions for exposure can be changed as by presetting a predetermined exposure time without using an automatic exposure detector.

The above-described four-position processing system in which preheating, cooling, exposure and development take place at individual positions permits easy maintenance because of different functions being performed at different positions, and reduces the time of recording because recording is successively made over a plurality of image forming areas by parallel processing. But exposure, heating and cooling can also be achieved at the same position; this will hereinafter be referred to as the one-position system. This system is particularly suitable for use with the so-called one-frame recording system in which a series of preheating, cooling, exposing and developing operations are performed in succession for each frame, that is, information of a subject is recorded for each frame. Therefore, the one-position system is particularly suitable for an aperture type image forming sheet, but can also be employed for recording on only one frame of the microfiche type image forming sheet having a number of frames.

In this case, heaters of the same type may be used for preheating and for heat-development, but it is desirable in many cases that the heating temperatures of these two heaters differ from each other. Accordingly, it is preferred, for reduction of the time for recording on the image forming sheet, to employ separate heaters and a cooler and arrange the heater transfer means so that the individual heaters or the cooler are brought to the same specified position of the image forming sheet within a desired period of time. Further, in this one-position system, the second frame-shaped member 73 for exposure use is employed in addition to the heaters and the cooler, and preheating, cooling, exposure and development are performed, with the image forming sheet fixedly held by the body tube member 53 and the abovesaid frame-shaped member 73.

Figure 19:
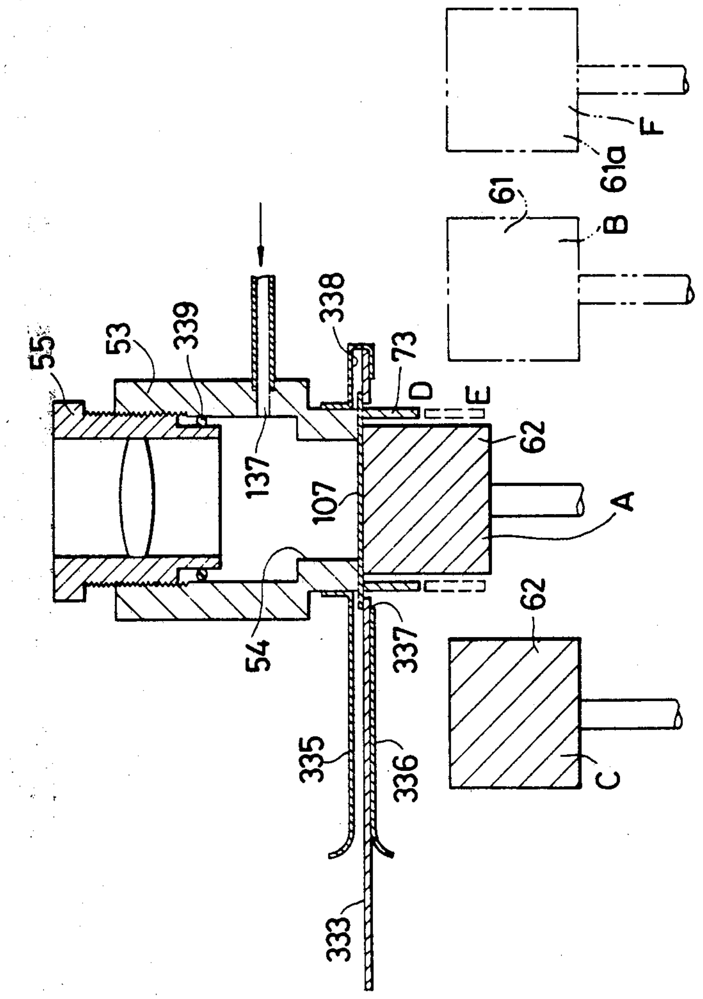
FIG. 19 is a cross-sectional view showing, by way of example, the body tube member and associated parts in one-position processing system.

FIG. 19 illustrates, in terms of conception, an example in which preheating, cooling, exposure and development are carried out in accordance with the one-position processing system. A pair of guides 335 and 336 are attached to the body tube member 53 so that one frame 107 of an aperture card 333 of an image forming sheet can be smoothly set at the exposure position, that is, at the position of the lower open end of the through hole 54. The lower guide has formed therein at the exposure position an opening a little larger than the second frame-shaped member 73, and one end of the guide 335 is formed to serve as a stopper so that the aperture card 333 is not inserted too much.

The surface of the image forming area 107 on the side of the body tube member 53 makes contact with the image forming position of the body tube member 53, and the body tube member 53 is threadably engaged with the body tube 55, and a pressurized gas inlet port 137 for introducing a pressurized gas from pressurized gas generating means (not shown) is formed in the side wall of the body tube member 53. An O-ring 339 for preventing leakage of the pressurized gas is interposed between the body tube member 53 and the body tube 55. The surface of the image forming area 107 on the opposite side from the body tube member 53 is pressed by the second frame-shaped member 73 for exposure use against the side of the body tube member 53 from the start of preheating until after completion of heat development, thus fixedly holding the image forming area 107 in position.

When holding the image forming area 107, the frame-shaped member 73 for exposure lies at its raised position D indicated by the solid line, but at the other times it assumes its lowered position E indicated by the broken line. This upward and downward movement of the frame-shaped member is performed by frame-shaped moving means (not shown).

The heater 61 for preheating is normally held at its stand-by position B, but when to carry out the preheating process it is brought by film transfer means (not shown) to an exposure position A surrounded by the second frame-shaped member 73 and preheats the image forming area 107, thereafter being returned to the position B. The cooler 61*a* normally stays at its stand-by position F, but in the case of cooling it is brought by cooler moving means (not shown) to the exposure position A for cooling the image forming area 107, thereafter being returned to the position F. The heater 62 for heat development is normally held at its stand-by position C and brought by heat-development heater moving means (not shown) to the exposure position A to heat-develop the image forming area 107, thereafter being brought back to the position C.

In the case of manually bringing the image forming area 107 of the aperture card 333 to the exposure position, no image forming sheet transfer means is needed. The portion of the aperture card 333 except the image forming area 107 may also be used as a holder. Also, it is possible to provide only one heater and increase the time of contact of the heater with the image forming area or change the degree of heating it in dependence on whether the heater is used for preheating of heat development.

The preheating, cooling or heat-development process may also be performed at a position different from that of exposure. Also, it is possible to adopt such a two-position processing system that the preheating, the cooling and the heat-development process take place at the same position different from the exposure position. Further, it is also possible to apply such a oneposition processing system as shown in FIG. 19 to each image forming area 107 of the image forming sheet 19 in place of the aperture card 333. The cooling of the image forming sheet after preheating has been described in the foregoing, but for preventing damage and thermal deformation of the image forming sheet, it is preferred that also after being heat-developed, the image forming sheet is cooled by the same cooling means used after the preheating process.

As has been described above, cooling of the image forming sheet after preheating but before exposure according to this invention is useful for obtaining a sharply-outlined, finely-contrasted sharp image; especially, forced cooling enables reduction of the time necessary for obtaining a visible image and hence is the most useful method. This will be described in more concrete terms in conjunction with examples of the invention described later. With the heat-developable image forming apparatus of this invention, an image can be recorded and developed on the image forming sheet frame by frame without the necessity of providing a dark room for handing a raw image forming sheet, and the developed image forming sheet can be preserved for subsequent reproduction of the record and, if necessary, can be loaded again on the image forming apparatus for newly recording on an unrecorded frame of the sheet.

Since no dark room is required and since development is not wet-type, no developer is used; consequently, the image forming apparatus is very simple in structure, and the image forming sheet can be preserved after being subjected to recording in one or some frames only and, if necessary, can be subjected to additional recording in other frames. Moreover, with the image forming apparatus provided with means for cooling the image forming sheet after preheated, which is one of the features of this invention, it is possible to cause a substantial increase in the sensitivity of the image forming sheet by cooling it after the heat-activation process, producing a sharply-outlined, finely-contrasted visible image.

The image forming method of this invention will be described in more detail in connection with its examples.

EXAMPLE 1

The image forming sheet was prefared by the following method. 4 parts by weight of silver behenate and 20 parts by weight of a mixed solution of methyl ethyl ketone and toluene (in the ratio of 2 to 1 by weight) were ball-milled for 24 hours to prepare a silver behenate suspension. The following compositions were prepared using the silver behenate suspension and coated a polyester film to a thickness of 100μ, and the coating was at room temperature.

| | |
|---|---|
| First layer | |
| Silver behenate suspension | 12 g |
| Polyvinylbutyral | 3 g |
| Methyl ethyl ketone | 12 g |
| Tetrabromobutane | 0.30 g |
| Mercury acetate | 0.05 g |
| Triphenylphosphine | 0.03 g |
| Bromine | 0.12 g |
| Cobalt bromide | 0.03 g |
| Quinoline | 0.25 g |
| Second layer | |
| Cellulose acetate | 1.2 g |
| Acetone | 16.3 g |
| Phthalazinone | 0.28 g |
| 2,2'-methylenebis (6-tert-butyl-4-ethylphenol) | 0.70 g |

After coating of the first layer, the second layer was coated thereon 60μ thick, and the coating was dried at room temperature.

The heating means and cooling means shown in FIG. 7 were employed for obtaining a visible image by preheating, exposing and developing a predetermined area of the image forming sheet thus produced.

Figure 20:
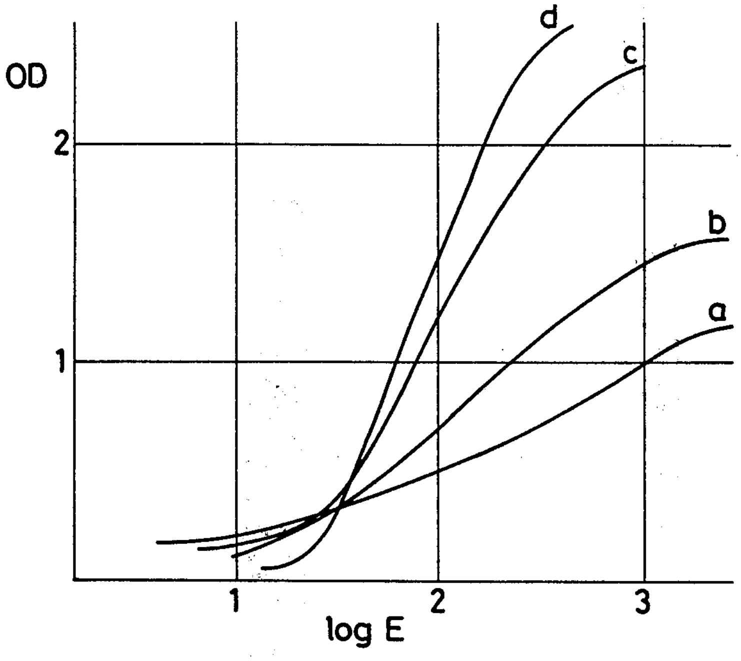

FIG. 20 shows the effect produced by the state of the image forming sheet until it is exposed to a light image after being preheated. The image forming sheet was rendered photosensitive by preheating at 100° C. for 3 sec., and irradiated by light of a 200 W-tungsten lamp through a step tablet at an illumination of 1000 lux. sec., and then developed at 120° C. for 3 sec. In FIG. 20, curves a, b, c and d indicate photosensitive characteristics of the image forming sheet in the cases of its temperature immediately before exposure being about 100° C., about 80° C., about 60° C. and room temperature respectively, the abscissa representing the quantity of light on a logarithmic scall and the ordinate the image density in optical density (CD).

Using a reciprocal of the time of exposure necessary for obtaining OD = 1.0 as a measure of substantial sensitivity of the image forming sheet, substantial sensitivity $\gamma$ and the maximum optical density increase and the minimum optical density decreases in the order of the curves a, b, c, and c, that is, with an increase in the degree of cooling of the sheet in the interval between preheating and exposure. This indicates that the more the sheet is cooled prior to exposure, the more sharply-outlined and finely-contrasted the resulting image becomes.

From the results shown in FIG. 20, it can be said that it is preferred that the image forming sheet is at a temperature below 60° C. In the case of the image forming sheet being exposed immediately after preheating without cooling, the transmission density of the sheet after development was 0.5 in a white area of an original and 0.2 in a black area, whereas in the case of the image forming sheet being preheated and then cooled down to room temperature prior to exposure, the transmission density of the sheet was 1.3 in the white area of the original and 0.1 in the black area. Accordingly, cooling after preheating enhances the sensitivity of the image forming sheet and provides a sharply-contrasted image.

EXAMPLE 2

Figure 21:
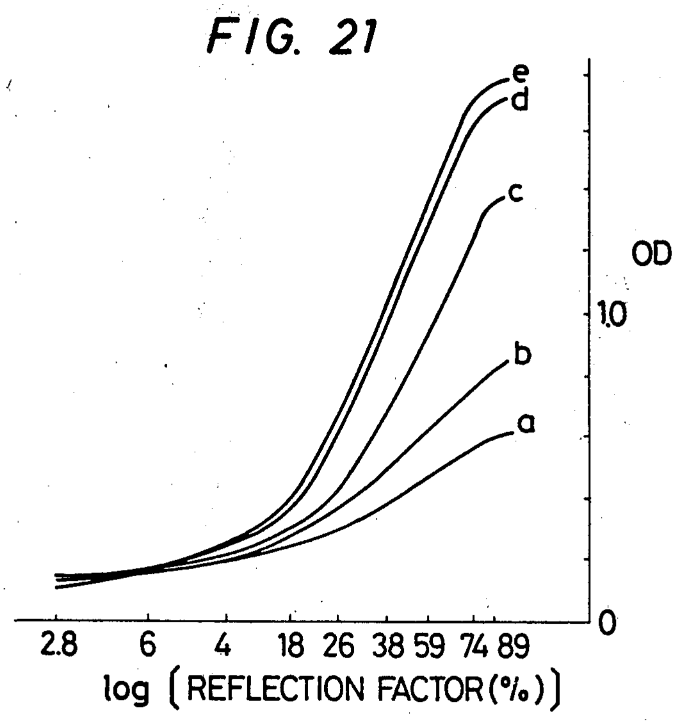

Images were formed on the image forming sheet of Example 1 by photographing test charts of different reflection factors using the image forming apparatus of this invention. FIG. 21 shows photosensitive characteristics obtained in the cases (a to e) of cooling by blowing air against the image forming sheet. In FIG. 21, the ordinate represents the optical densities of the resulting images and the abscissa represents, on a logarithmic scall the reflection factors (%) of the test charts used, numerals on the abscissa being the reflection factors. Preheating was performed at 100° C. for 3 sec. Exposure was carried out by illuminating the test charts with a 20 W-fluorescent lamp, and the test charts were photographed on a reduced scale. Development was achieved at 120° C. for 3 sec. The temperature of the image forming sheet at the time of exposure was about 95° C. in the case of the curve a, 70° C. in the case of the curve b, 60° C. in the case of the curve c, about 40° C. in the case of the curve d and about 30° C. in the case of the curve e. It is seen from FIG. 21 that a sharply-contrasted, clear image can be obtained by cooling the image forming sheet in the interval between preheating and exposure. Further, it is understood that the temperature of the sheet at the time of exposure is preferred to be lower than 60° C. and that the sheet temperature below 40° C. produces substantially the same result as is obtainable in the case of room temperature and hence is more preferred.

EXAMPLE 3

The image forming sheet was prepared by the following method corresponding to the method set forth in the aforementioned U.S. Pat. No. 3,802,888.

85 parts by weight of a 1:1 mixed solvent of tolenene and methyl ethyl ketone and 15 weight parts of silver behenate were homogeneously mixed to prepare a paste of silver behenate. Then, 35 g of a 9% polyvinyl butyral-methyl ethyl ketone was added to 17 g of paste with stirring to obtain a silver behenate dispersed polyvinyl butyral solution. To this solution were added 0.25 g of phthalazinone, 0.1 g of $HgBr_2$ and 0.89 g of bis-(2-hydroxy-3,5-di-tert-butylphenyl) methane, and the mixture was stirred. The mixture was coated 80μ thick on a polyester film, and the coating was dried at room temperature. Next, a 5% cellulose acetate-acetone solution was coated on the dried coating to a thickness of 50μ and dried at room temperature to form a protective layer.

After being preheated at 100° C. for 15 sec., the image forming sheet thus obtained was cooled by the same cooling method as used in Example 1, irradiated by a 500 W-tungsten lamp through a step tablet at an illumination of 500,000 lux.sec. and then developed at 135° C. for 10 sec. It was ascertained that cooling prior to exposure enhanced the substantial sensitivity and the maximum optical density, as was the case with Example 1.

EXAMPLE 4

The image forming sheet was prepared by the following method corresponding to the method disclosed in U.S. Pat. No. 3,764,329.

15 parts by weight of silver behenate and 85 parts by weight of methyl ethyl ketone were homogeneously mixed to obtain a silver behenate suspension. To 67 g of silver behenate suspension were added 60 g of methyl ethyl ketone, 10 g of polyvinyl butyral, 0.35 g of mercuric acetate, 0.49 g of N-bromosuccinimide and 20 g of 1-methylpyrrolydine, and they were sufficiently mixed and dissolved. The mixture was coated on a polyester film to a thickness of 100μ and air-dried at room temperature. Next, a solution consisting of 12 parts by weight of cellulose acetate, 163 parts by weight of acetone, 2.8 parts by weight of phthalazinone and 7 parts by weight of 2,4,4-trimethyl-pentyl-bis (2-hydroxy-3.5-dimethylphenyl) methane was coated on the first layer to a thickness of 60μ, and the coating was dried. After being preheated at 100° C. for 8 sec., the image forming sheet thus obtained was cooled by the same method as used in Example 1 and irradiated by light of a 500 W-tungsten lamp through a step tablet at an illumination of 30000 lux·sec and then developed at 130° C. for 10 sec. it was ascertained that cooling before exposure enhanced the substantial sensitivity $\gamma$ and the maximum optical density as in the case of Example 1.

EXAMPLE 5

The image forming sheet was prepared by the following method corresponding to the method set forth in U.S. Pat. No. 4,113,496.

12 parts by weight of silver behenate and 88 parts by weight of a 2:1 mixed solvent of methyl ethyl ketone were homogenously mixed to obtain a silver behenate suspension. 6 g of the silver behenate suspension was sufficiently mixed with 4 g of methyl ethyl ketone, 0.72 g of polyvinylbutyral, 0.02 g of mercuric acetate, 0.096 g of tetrabromobuthane, 0.03 g of bis-(P-methoxy phenyl) tellurium-dibromide and 1.2 ml of sensitizing coloring matter solution. The mixture was coated on a polyester film to a thickness of 100μ, and the coating was dried at room temperature. The sensitizing coloring matter solution is a solution containing 0.4 g of 3-carboxyethyl-5-[(3-ethyl-2 benzothiazolinindene)-2-butenylidene]rhodanine. Then, a solution consisting of 8.3 g acetone, 0.62 g of cellulose acetate, 0.14 g of phthazinone and 0.35 g of 2,2'-methylen-bis-(4-ethyl-6-tert-butyl) phenol was coated on the abovesaid coating to a thickness of 60μ and dried at room temperature.

The image forming sheet thus obtained was preheated at 100° C. for 3 sec., cooled by the same method as used in Example 1, irradiated by light of a 500 W-tungsten lamp through a step tablet at an illumination of 10000 lux·sec and then developed at 120° C. for 3 sec. As in Example 1, the effect of enhancement of the substantial sensitivity γ and the maximum optical density by preheating prior to exposure was ascertained.

EXAMPLE 6

The image forming sheet was prepared by the following method corresponding to that disclosed in U.S. Pat. No. 3,816,132 and Japanese Patent Disclosure Gazette No. 127,719/76.

17 g of silver behenate, 13 g of behenic acid, 40 g of polyvinyl butyral, 350 ml of toluene and 350 ml of ethanol were sufficiently mixed homogeneously. The mixture was coated on a polyester film to a thickness of 100μ and dried at room temperature. Then, a mixture consisting of 51 g of 2,2'-methylenebis-(4-methyl-6-tert-butylphenol), 15 g of phthalazinone, 0.16 g of mercuric acetate, 0.01 g of

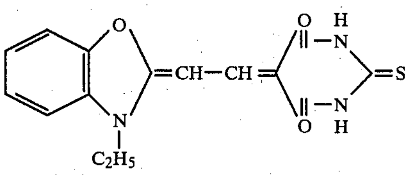

10 g of polyvinyl butyral and 1 l of ethanol was coated on the abovesaid coating to a thickness of 60μ and dried at room temperature.

The image forming sheet thus obtained was preheated at 100° C. for 5 sec., cooled by the same method as used in Example 1, irradiated by light of a 500 W-tungsten lamp through a step tablet at an illumination of 200,000 lux·sec. and then developed at 120° C. for 5 sec. Also in this example, it was ascertained that the substantial sensitivity γ and the maximum optical density were increased by cooling prior to exposure as in the case of Example 1.

It will be apparent that many modifications and variations may be effected without departing from the scope of the novel concepts of this invention.

What is claimed is:

1. Image forming apparatus for forming an image using a heat-developable image forming sheet that is normally non-photosensitive but can be rendered photosensitive by preheating prior to exposure and exposed to a light image to form therein a latent image and then heat-developed to obtain a visible image, comprising one or two heating means for heating and heat-developing an image forming area of the image forming sheet;

cooling means for cooling the preheated image forming area of the image forming sheet prior to exposure; and exposure means for projecting an optical image of a subject to the cooled image forming area of the image forming sheet for exposure.

2. Image forming apparatus according to claim 1, wherein the cooling means has a thermally conductive solid body held at a temperature below 60° C. and making direct contact with the image forming area of the image forming sheet for cooling it.

3. Image forming apparatus according to claim 2, wherein means is provided for applying a pressurizing fluid to the image forming sheet on the opposite side from the side on which the solid body is held in direct contact with the image forming sheet.

4. Image forming apparatus according to claim 3, wherein the pressurizing fluid is pressurized air.

5. Image forming apparatus according to claim 2, wherein means is provided for producing a negative pressure between the solid body and the contact surface of the image forming sheet therewith when the former is held in direct contact with the latter.

6. Image forming apparatus according to claim 2, wherein a frame-shaped member is disposed on the opposite side from the side on which the solid body makes contact with the image forming sheet, and wherein means is provided for introducing a pressurizing fluid from the outside into the frame-shaped member to apply the pressurizing fluid to the image forming sheet within the frame-shaped member.

7. Image forming apparatus according to claim 1, wherein the cooling means is means for blowing a gas of a temperature below about 60° C. against the image forming sheet.

8. Image forming apparatus according to claim 7, wherein the cooling means is arranged so that the gas is applied to the surface of the image forming area of the image forming sheet from the inside of the frame-shaped member disposed in contact with the image forming sheet at the position of the heating or exposure means.

9. Image forming apparatus according to claim 1, wherein at least one of the heating means, the cooling means and the exposure means is provided with means for fixing the image forming area of the image forming sheet at the position for the corresponding process.

10. Image forming apparatus according to claim 9, wherein the at least one fixing means has one frame-shaped member for holding the image forming sheet surrounding its image forming area.

11. Image forming apparatus according to claim 9, wherein the at least one fixing means comprises a pair of opposing first and second frame-shaped members for holding therebetween the image forming sheet surrounding its image forming area.

12. Image forming apparatus according to claim 9, wherein the exposure means includes a body tube member, and wherein the end face of the body tube member on the side of the image forming sheet is frame-shaped to form at least one part of the fixing means for the exposure means.

13. Image forming apparatus according to claim 12, wherein the fixing means comprises a second frame-shaped member provided for the exposure means in opposing relation to the frame-shaped end face of the body tube member and is arranged to hold the image forming sheet between the frame-shaped end face and the end face of the second frame-shaped member surrounding the image forming area of the image forming sheet.

14. Image forming apparatus according to claim 13, wherein there are provided means for directing projection light through the inside of the second frame-shaped member to the image forming area of the image forming sheet held in contact with the second frame-shaped member and means for projecting to a screen projection light having transmitted through the image forming area and passed through a through hole of the body tube member.

15. Image forming apparatus according to claim 1, wherein the heating means has a high-temperature solid body which makes direct contact with the image forming area of the image forming sheet for heating it.

16. Image forming apparatus according to claim 15, wherein the high-temperature solid body is a heat conductor having incorporated therein a heater and includes means for controlling its temperature at a predetermined value.

17. Image forming apparatus according to claim 15, wherein means is provided for applying a pressurizing fluid to the image forming sheet on the opposite side from the side on which the image forming sheet contacts the high-temperature solid body when the latter is held in direct contact with the former.

18. Image forming apparatus according to claim 17, wherein the pressurizing fluid is pressurized air.

19. Image forming apparatus according to claim 17, wherein a frame-shaped member is disposed on the opposite side from the side on which the high-temperature solid body is held in direct contact with the image forming sheet, and wherein means is provided for introducing a pressurizing fluid from the outside into the frame-shaped member to apply the pressurizing fluid to the image forming within the frame-shaped member.

20. Image forming apparatus according to claim 15, wherein means is provided for producing a negative pressure between the high-temperature solid body and the image forming sheet contacting therewith when the former is held in direct contact with the latter.

21. Image forming apparatus according to claim 1, wherein the heating means heats the image forming area of the image forming sheet by contacting therewith a high-temperature gas.

22. Image forming apparatus according to claim 21, wherein the high-temperature gas is air heated up to 80° to 220° C.

23. Image forming apparatus according to claim 21, wherein the high-temperature gas is air which is present between the image forming sheet and a high-temperature solid body disposed in adjacent but spaced relation thereto and is heated by the high-temperature solid body.

24. Image forming apparatus according to claim 1, wherein the heating means irradiates the image forming area of the image forming sheet by infrared or far infrared rays.

25. Image forming apparatus according to claim 1, wherein the heating means comprises first and second heating means provided individually for preheating and for heat development.

26. Image forming apparatus according to claim 25, wherein at least three means of the first heating means, the exposure means and the second heating means are arranged in alignment.

27. Image forming apparatus according to claim 25, wherein the first heating means for preheating, the cooling means, the exposure means and the second heating means for heat development are arranged in alignment.

28. Image forming apparatus according to claim 27, wherein the first heating means, the cooling means, the exposure means and the second heating means are fixed in alignment relative to one another or formed as a unitary structure.

29. Image forming apparatus according to claim 27, which is arranged so that processings by the first heating means, the cooling means, the exposure means and the second heating means are respectively performed for a plurality of image forming areas on the image forming sheet in parallel at the same time.

30. Image forming apparatus according to claim 1, wherein checking means for preventing double image formation in an already recorded image forming area.

31. Image forming apparatus according to claim 30, wherein the checking means includes a light emitting device and a photo detector, wherein light emitted from the light emitting device and transmitted through or reflected by the image forming sheet is received by the photo detector, and wherein double image formation is checked by a comparison of the intensity of the photo detector output with a preset value.

32. Image forming apparatus according to claim 31, wherein a portion for holding the subject is arranged so that the image of a strip different in reflection factor from the image forming sheet is formed to extend along at least one of all four side of the image forming area of the image forming sheet when the image of a subject is formed in the image forming area, and wherein the strip in the image forming area is detected by the checking means.

33. Image forming apparatus according to claim 25, wherein checking means is provided for preventing double image formation in an already recorded image forming area, and wherein at least four means of the checking means, the first heating means, the exposure means and the second heating means are arranged in alignment.

34. Image forming apparatus according to claim 25, wherein checking means for preventing double image formation in an already recorded image forming area is provided adjacent the first heating means, and wherein the detecting means, the first heating means, the cooling means, the exposure means and the second heating means are all arranged in alignment.

35. Image forming apparatus according to claim 34, which is arranged so that processings by the five means are respectively performed for different image forming areas of the image forming sheet in parallel at the same time.

* * * * *